United States Patent
Richardson et al.

(10) Patent No.: US 8,412,823 B1
(45) Date of Patent: Apr. 2, 2013

(54) MANAGING TRACKING INFORMATION ENTRIES IN RESOURCE CACHE COMPONENTS

(75) Inventors: David R. Richardson, Seattle, WA (US); Bradley E. Marshall, Bainbridge Island, WA (US); Swaminathan Sivasubramanian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 969 days.

(21) Appl. No.: 12/412,443

(22) Filed: Mar. 27, 2009

(51) Int. Cl.
*G06F 13/00* (2006.01)
(52) U.S. Cl. ...................................... 709/225
(58) Field of Classification Search .................. 709/225, 709/230
See application file for complete search history.

(56) References Cited

U.S. PATENT DOCUMENTS

| | | |
|---|---|---|
| 5,341,477 A | 8/1994 | Pitkin et al. |
| 5,611,049 A | 3/1997 | Pitts |
| 5,774,660 A | 6/1998 | Brendel et al. |
| 5,892,914 A | 4/1999 | Pitts |
| 6,016,512 A | 1/2000 | Huitema |
| 6,026,452 A | 2/2000 | Pitts |
| 6,052,718 A | 4/2000 | Gifford |
| 6,085,234 A | 7/2000 | Pitts et al. |
| 6,098,096 A | 8/2000 | Tsirigotis et al. |
| 6,108,703 A | 8/2000 | Leighton et al. |
| 6,182,111 B1 | 1/2001 | Inohara et al. |
| 6,185,598 B1 | 2/2001 | Farber et al. |
| 6,192,051 B1 | 2/2001 | Lipman et al. |
| 6,205,475 B1 | 3/2001 | Pitts |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,415,280 B1 | 7/2002 | Farber et al. |
| 6,457,047 B1 | 9/2002 | Chandra et al. |
| 6,484,143 B1 | 11/2002 | Swildens et al. |
| 6,505,241 B2 | 1/2003 | Pitts |

(Continued)

FOREIGN PATENT DOCUMENTS

| | | |
|---|---|---|
| CN | 1422468 A | 6/2003 |
| WO | WO 2007/007960 A1 | 1/2007 |
| WO | WO 2012/044587 A1 | 4/2012 |

OTHER PUBLICATIONS

Baglioni et al., "Preprocessing and Mining Web Log Data for Web Personalization", LNAI 2829, 2003, pp. 237-249.

(Continued)

*Primary Examiner* — Robert B Harrell
(74) *Attorney, Agent, or Firm* — Knobbe, Martens, Olson & Bear LLP

(57) ABSTRACT

A system, method, and computer readable medium for managing resources maintained in resource cache components are provided. A network storage provider storing one or more resources on behalf of a content provider obtains client computing device requests for content. The network storage provider provides resources that are received and maintained on resource cache components. The network storage provider either processes requests or provides notifications to the resource cache components to facilitate the management of resources that need to be updated or are otherwise treated as invalid.

34 Claims, 22 Drawing Sheets

U.S. PATENT DOCUMENTS

| | | |
|---|---|---|
| 6,553,413 B1 | 4/2003 | Leighton et al. |
| 6,560,610 B1 | 5/2003 | Eatherton et al. |
| 6,654,807 B2 | 11/2003 | Farber et al. |
| 6,658,462 B1 | 12/2003 | Dutta |
| 6,678,791 B1 | 1/2004 | Jacobs et al. |
| 6,694,358 B1 | 2/2004 | Swildens et al. |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,785,704 B1 | 8/2004 | McCanne |
| 6,804,706 B2 | 10/2004 | Pitts |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,143,169 B1 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 | 7/2007 | Wein et al. |
| 7,254,636 B1 * | 8/2007 | O'Toole et al. ............... 709/230 |
| 7,260,598 B1 | 8/2007 | Liskov et al. |
| 7,269,784 B1 | 9/2007 | Kasriel et al. |
| 7,289,519 B1 | 10/2007 | Liskov |
| 7,293,093 B2 | 11/2007 | Leighton |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,363,291 B1 | 4/2008 | Page |
| 7,441,045 B2 | 10/2008 | Skene et al. |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,624,169 B2 | 11/2009 | Lisiecki et al. |
| 7,650,376 B1 | 1/2010 | Blumenau |
| 7,653,700 B1 | 1/2010 | Bahl et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,716,367 B1 | 5/2010 | Leighton et al. |
| 7,725,602 B2 | 5/2010 | Liu et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,769,823 B2 | 8/2010 | Jenny et al. |
| 7,773,596 B1 | 8/2010 | Marques |
| 7,774,342 B1 | 8/2010 | Virdy |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,962,597 B2 | 6/2011 | Richardson et al. |
| 7,966,404 B2 | 6/2011 | Hedin et al. |
| 7,991,910 B2 | 8/2011 | Richardson et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,065,275 B2 | 11/2011 | Eriksen et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0056416 A1 | 12/2001 | Garcia-Luna-Aceves |
| 2001/0056500 A1 | 12/2001 | Farber et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0116481 A1 | 8/2002 | Lee |
| 2002/0124098 A1 | 9/2002 | Shaw |
| 2002/0129123 A1 | 9/2002 | Johnson et al. |
| 2002/0138286 A1 | 9/2002 | Engstrom |
| 2002/0138437 A1 | 9/2002 | Lewin et al. |
| 2002/0147770 A1 | 10/2002 | Tang |
| 2002/0156911 A1 | 10/2002 | Croman et al. |
| 2002/0163882 A1 | 11/2002 | Bornstein et al. |
| 2002/0188722 A1 | 12/2002 | Banerjee et al. |
| 2003/0002484 A1 | 1/2003 | Freedman |
| 2003/0009591 A1 | 1/2003 | Hayball et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0099202 A1 | 5/2003 | Lear et al. |
| 2003/0101278 A1 | 5/2003 | Garcia-Luna-Aceves et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145066 A1 | 7/2003 | Okada et al. |
| 2003/0149581 A1 | 8/2003 | Chaudhri et al. |
| 2003/0163722 A1 | 8/2003 | Anderson, IV |
| 2003/0172183 A1 | 9/2003 | Anderson, IV et al. |
| 2003/0174648 A1 | 9/2003 | Wang et al. |
| 2003/0182413 A1 | 9/2003 | Allen et al. |
| 2003/0187935 A1 | 10/2003 | Agarwalla et al. |
| 2003/0187970 A1 | 10/2003 | Chase et al. |
| 2003/0191822 A1 | 10/2003 | Leighton et al. |

| | | | | | |
|---|---|---|---|---|---|
| 2003/0204602 A1 | 10/2003 | Hudson et al. | 2006/0253609 A1 | 11/2006 | Andreev et al. |
| 2003/0229682 A1 | 12/2003 | Day | 2006/0259984 A1 | 11/2006 | Juneau |
| 2003/0233423 A1 | 12/2003 | Dilley et al. | 2006/0265508 A1 | 11/2006 | Angel et al. |
| 2003/0236700 A1 | 12/2003 | Arning et al. | 2006/0265516 A1 | 11/2006 | Schilling |
| 2004/0010621 A1 | 1/2004 | Afergan et al. | 2006/0265720 A1 | 11/2006 | Cai et al. |
| 2004/0019518 A1 | 1/2004 | Abraham et al. | 2006/0271641 A1 | 11/2006 | Stavrakos et al. |
| 2004/0024841 A1 | 2/2004 | Becker et al. | 2006/0282522 A1 | 12/2006 | Lewin et al. |
| 2004/0030620 A1 | 2/2004 | Benjamin et al. | 2007/0005689 A1 | 1/2007 | Leighton et al. |
| 2004/0034744 A1 | 2/2004 | Karlsson et al. | 2007/0005892 A1 | 1/2007 | Mullender et al. |
| 2004/0039798 A1 | 2/2004 | Hotz et al. | 2007/0011267 A1 | 1/2007 | Overton et al. |
| 2004/0044791 A1 | 3/2004 | Pouzzner | 2007/0014241 A1 | 1/2007 | Banerjee et al. |
| 2004/0064501 A1 | 4/2004 | Jan et al. | 2007/0038994 A1 | 2/2007 | Davis et al. |
| 2004/0073596 A1 | 4/2004 | Kloninger et al. | 2007/0041393 A1 | 2/2007 | Westhead et al. |
| 2004/0073867 A1 | 4/2004 | Kausik et al. | 2007/0043859 A1 | 2/2007 | Ruul |
| 2004/0078468 A1 | 4/2004 | Hedin et al. | 2007/0050522 A1 | 3/2007 | Grove et al. |
| 2004/0078487 A1 | 4/2004 | Cernohous et al. | 2007/0055764 A1 | 3/2007 | Dilley et al. |
| 2004/0083307 A1 | 4/2004 | Uysal | 2007/0076872 A1 | 4/2007 | Juneau |
| 2004/0117455 A1 | 6/2004 | Kaminsky et al. | 2007/0094361 A1 | 4/2007 | Hoynowski et al. |
| 2004/0128344 A1 | 7/2004 | Trossen | 2007/0101377 A1 | 5/2007 | Six et al. |
| 2004/0128346 A1 | 7/2004 | Melamed et al. | 2007/0118667 A1 | 5/2007 | McCarthy et al. |
| 2004/0167981 A1 | 8/2004 | Douglas et al. | 2007/0118668 A1 | 5/2007 | McCarthy et al. |
| 2004/0172466 A1 | 9/2004 | Douglas et al. | 2007/0134641 A1 | 6/2007 | Lieu |
| 2004/0194085 A1 | 9/2004 | Beaubien et al. | 2007/0168517 A1 | 7/2007 | Weller |
| 2004/0203630 A1 | 10/2004 | Wang | 2007/0174426 A1 | 7/2007 | Swildens et al. |
| 2004/0205149 A1 | 10/2004 | Dillon et al. | 2007/0174442 A1 | 7/2007 | Sherman et al. |
| 2004/0205162 A1 | 10/2004 | Parikh | 2007/0183342 A1 | 8/2007 | Wong et al. |
| 2004/0215823 A1 | 10/2004 | Kleinfelter et al. | 2007/0208737 A1 | 9/2007 | Li et al. |
| 2004/0249971 A1 | 12/2004 | Klinker | 2007/0219795 A1 | 9/2007 | Park et al. |
| 2004/0249975 A1 | 12/2004 | Tuck et al. | 2007/0220010 A1 | 9/2007 | Ertugrul |
| 2004/0267906 A1 | 12/2004 | Truty | 2007/0244964 A1 | 10/2007 | Challenger et al. |
| 2004/0267907 A1 | 12/2004 | Gustafsson | 2007/0250467 A1 | 10/2007 | Mesnik et al. |
| 2005/0010653 A1 | 1/2005 | McCanne | 2007/0250560 A1 | 10/2007 | Wein et al. |
| 2005/0021706 A1 | 1/2005 | Maggi et al. | 2007/0266113 A1 | 11/2007 | Koopmans et al. |
| 2005/0038967 A1 | 2/2005 | Umbehocker et al. | 2007/0266311 A1 | 11/2007 | Westphal |
| 2005/0044270 A1 | 2/2005 | Grove et al. | 2007/0266333 A1 | 11/2007 | Cossey et al. |
| 2005/0108169 A1 | 5/2005 | Balasubramanian et al. | 2007/0271385 A1 | 11/2007 | Davis et al. |
| 2005/0108529 A1 | 5/2005 | Juneau | 2007/0280229 A1 | 12/2007 | Kenney |
| 2005/0114296 A1 | 5/2005 | Farber et al. | 2007/0288588 A1 | 12/2007 | Wein et al. |
| 2005/0132083 A1 | 6/2005 | Raciborski et al. | 2008/0005057 A1 | 1/2008 | Ozzie et al. |
| 2005/0157712 A1 | 7/2005 | Rangarajan et al. | 2008/0008089 A1 | 1/2008 | Bornstein et al. |
| 2005/0171959 A1 | 8/2005 | Deforche et al. | 2008/0025304 A1 | 1/2008 | Venkataswami et al. |
| 2005/0188073 A1 | 8/2005 | Nakamichi et al. | 2008/0046596 A1 | 2/2008 | Afergan et al. |
| 2005/0192008 A1 | 9/2005 | Desai et al. | 2008/0065724 A1 | 3/2008 | Seed et al. |
| 2005/0216569 A1 | 9/2005 | Coppola et al. | 2008/0065745 A1 | 3/2008 | Leighton et al. |
| 2005/0216674 A1 | 9/2005 | Robbin et al. | 2008/0071859 A1 | 3/2008 | Seed et al. |
| 2005/0232165 A1 | 10/2005 | Brawn et al. | 2008/0071987 A1 | 3/2008 | Karn et al. |
| 2005/0259672 A1 | 11/2005 | Eduri | 2008/0072264 A1 | 3/2008 | Crayford |
| 2005/0262248 A1 | 11/2005 | Jennings, III et al. | 2008/0082551 A1 | 4/2008 | Farber et al. |
| 2005/0267991 A1 | 12/2005 | Huitema et al. | 2008/0086574 A1 | 4/2008 | Raciborski et al. |
| 2005/0267992 A1 | 12/2005 | Huitema et al. | 2008/0103805 A1 | 5/2008 | Shear et al. |
| 2005/0267993 A1 | 12/2005 | Huitema et al. | 2008/0104268 A1 | 5/2008 | Farber et al. |
| 2005/0278259 A1 | 12/2005 | Gunaseelan et al. | 2008/0114829 A1 | 5/2008 | Button et al. |
| 2006/0013158 A1 | 1/2006 | Ahuja et al. | 2008/0134043 A1 | 6/2008 | Georgis et al. |
| 2006/0020596 A1 | 1/2006 | Liu et al. | 2008/0147866 A1 | 6/2008 | Stolorz et al. |
| 2006/0020684 A1 | 1/2006 | Mukherjee et al. | 2008/0147873 A1 | 6/2008 | Matsumoto |
| 2006/0020715 A1 | 1/2006 | Jungck | 2008/0155061 A1 | 6/2008 | Afergan et al. |
| 2006/0026067 A1 | 2/2006 | Nicholas et al. | 2008/0155614 A1 | 6/2008 | Cooper et al. |
| 2006/0026154 A1 | 2/2006 | Altinel et al. | 2008/0162667 A1 | 7/2008 | Verma et al. |
| 2006/0036720 A1 | 2/2006 | Faulk, Jr. | 2008/0189437 A1 | 8/2008 | Halley |
| 2006/0037037 A1 | 2/2006 | Miranz | 2008/0201332 A1 | 8/2008 | Souders et al. |
| 2006/0047787 A1 | 3/2006 | Agarwal et al. | 2008/0215718 A1 | 9/2008 | Stolorz et al. |
| 2006/0063534 A1 | 3/2006 | Kokkonen et al. | 2008/0215735 A1 | 9/2008 | Farber et al. |
| 2006/0064500 A1 | 3/2006 | Roth et al. | 2008/0215750 A1 | 9/2008 | Farber et al. |
| 2006/0074750 A1 | 4/2006 | Clark et al. | 2008/0222281 A1 | 9/2008 | Dilley et al. |
| 2006/0075084 A1 | 4/2006 | Lyon | 2008/0222291 A1 | 9/2008 | Weller et al. |
| 2006/0075139 A1 | 4/2006 | Jungck | 2008/0222295 A1 | 9/2008 | Robinson et al. |
| 2006/0083165 A1 | 4/2006 | McLane et al. | 2008/0228920 A1 | 9/2008 | Souders et al. |
| 2006/0112176 A1 | 5/2006 | Liu et al. | 2008/0235400 A1 | 9/2008 | Slocombe et al. |
| 2006/0120385 A1 | 6/2006 | Atchison et al. | 2008/0275772 A1 | 11/2008 | Suryanarayana et al. |
| 2006/0143293 A1 | 6/2006 | Freedman | 2008/0281950 A1 | 11/2008 | Wald et al. |
| 2006/0155823 A1 | 7/2006 | Tran et al. | 2008/0288722 A1 | 11/2008 | Lecoq et al. |
| 2006/0161541 A1 | 7/2006 | Cencini | 2008/0301670 A1 | 12/2008 | Gouge et al. |
| 2006/0168088 A1 | 7/2006 | Leighton et al. | 2008/0319862 A1 | 12/2008 | Golan et al. |
| 2006/0190605 A1 | 8/2006 | Franz et al. | 2009/0013063 A1 | 1/2009 | Soman |
| 2006/0193247 A1 | 8/2006 | Naseh et al. | 2009/0016236 A1 | 1/2009 | Alcala et al. |
| 2006/0195866 A1 | 8/2006 | Thukral | 2009/0029644 A1 | 1/2009 | Sue et al. |
| 2006/0230137 A1 | 10/2006 | Gare et al. | 2009/0031367 A1 | 1/2009 | Sue |
| 2006/0233155 A1 | 10/2006 | Srivastava | 2009/0031368 A1 | 1/2009 | Ling |
| 2006/0253546 A1 | 11/2006 | Chang et al. | 2009/0031376 A1 | 1/2009 | Riley et al. |

| | | |
|---|---|---|
| 2009/0049098 A1 | 2/2009 | Pickelsimer et al. |
| 2009/0070533 A1 | 3/2009 | Elazary et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2009/0327517 A1 | 12/2009 | Sivasubramanian et al. |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0036944 A1 | 2/2010 | Douglis et al. |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |
| 2010/0125673 A1 | 5/2010 | Richardson et al. |
| 2010/0125675 A1 | 5/2010 | Richardson et al. |
| 2010/0150155 A1 | 6/2010 | Napierala |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257566 A1 | 10/2010 | Matila |
| 2010/0293479 A1 | 11/2010 | Rousso et al. |
| 2010/0299439 A1 | 11/2010 | McCarthy et al. |
| 2010/0332595 A1 | 12/2010 | Fullagar et al. |
| 2011/0078000 A1 | 3/2011 | Ma et al. |
| 2011/0078230 A1 | 3/2011 | Sepulveda |
| 2011/0153941 A1 | 6/2011 | Spatscheck et al. |
| 2011/0238501 A1 | 9/2011 | Almeida |
| 2011/0252142 A1 | 10/2011 | Richardson et al. |
| 2011/0258049 A1 | 10/2011 | Ramer et al. |
| 2011/0276623 A1 | 11/2011 | Girbal |
| 2012/0066360 A1 | 3/2012 | Ghosh |
| 2012/0179839 A1 | 7/2012 | Raciborski et al. |

OTHER PUBLICATIONS

Liu et al., "Combined mining of Web server logs and web contents for classifying user navigation patterns and predicting users' future requests," Data & Knowledge Engineering 61 (2007) pp. 304-330.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Xu et al., "Decision tree regression for soft classification of remote sensing data", Remote Sensing of Environment 97 (2005) pp. 322-336.

American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.

International Search Report and Written Opinion in PCT/US2011/061486 mailed Mar. 30, 2012 in 11 pages.

Singapore Examination Report in Application No. 201006837-7 mailed May 16, 2012.

First Office Action in Chinese Application No. 200980119993.1 dated Jul. 4, 2012.

First Office Action in Chinese Application No. 200980119995.0 dated Jul. 6, 2012.

International Search Report and Written Opinion in PCT/US2011/053302 mailed Nov. 28, 2011 in 11 pages.

Singapore Written Opinion in Application No. 201006836-9, mailed Oct. 12, 2011 in 12 pages.

Singapore Written Opinion in Application No. 201006837-7, mailed Oct. 12, 2011 in 11 pages.

Singapore Written Opinion in Application No. 201006874-0, mailed Oct. 12, 2011 in 10 pages.

Supplementary European Search Report in Application No. 09727694.3 mailed Jan. 30, 2012 in 6 pages.

* cited by examiner

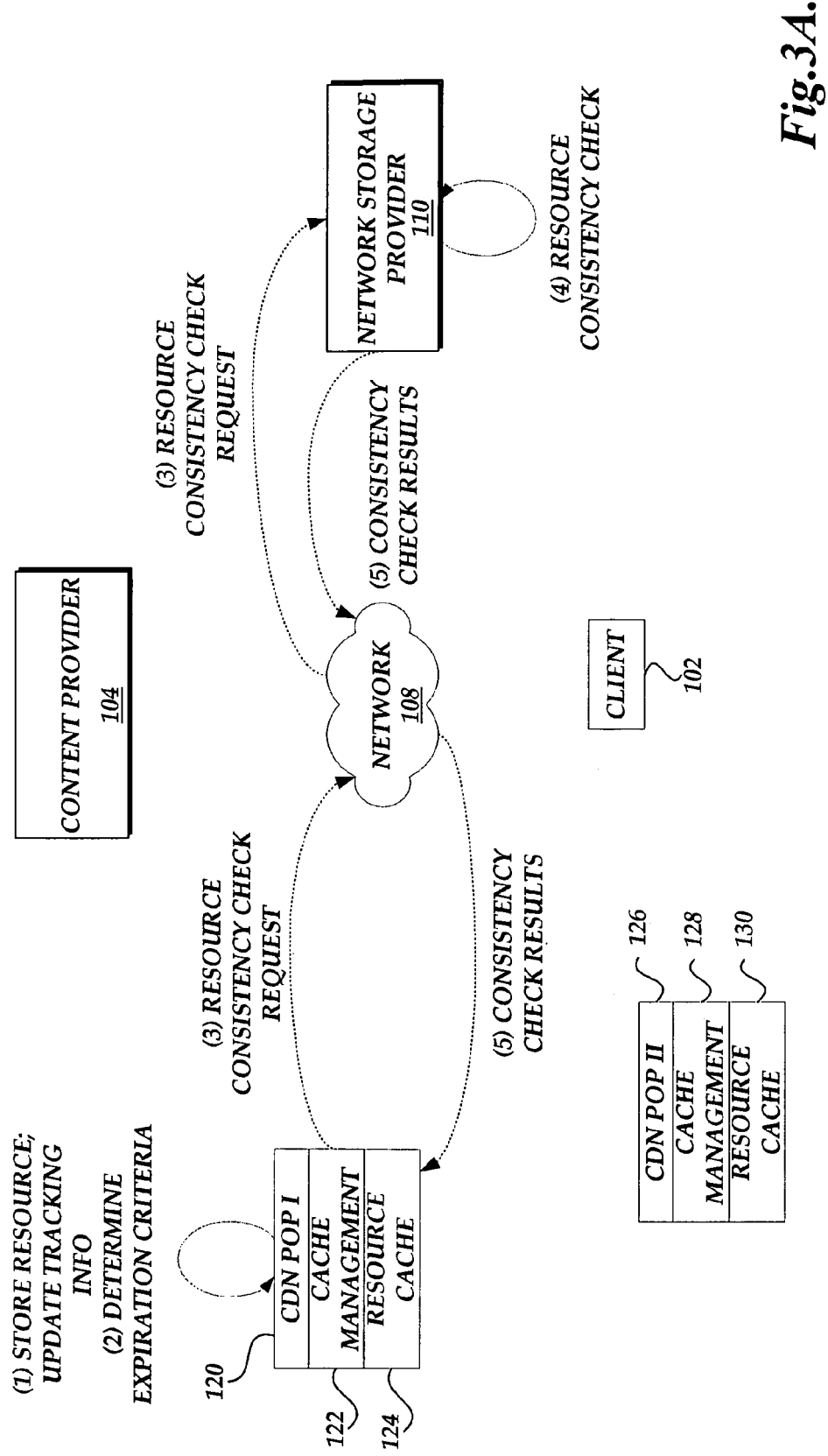

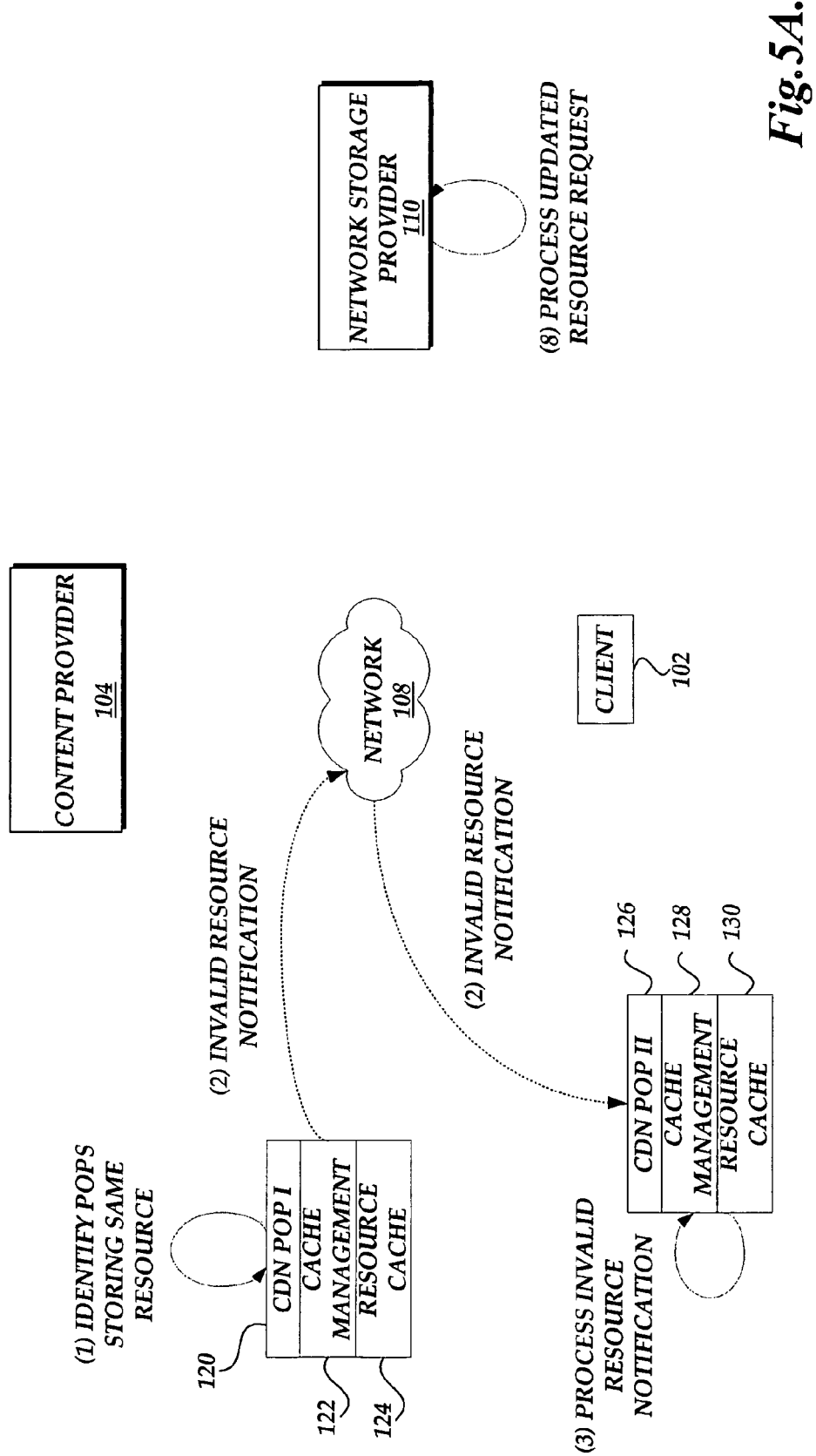

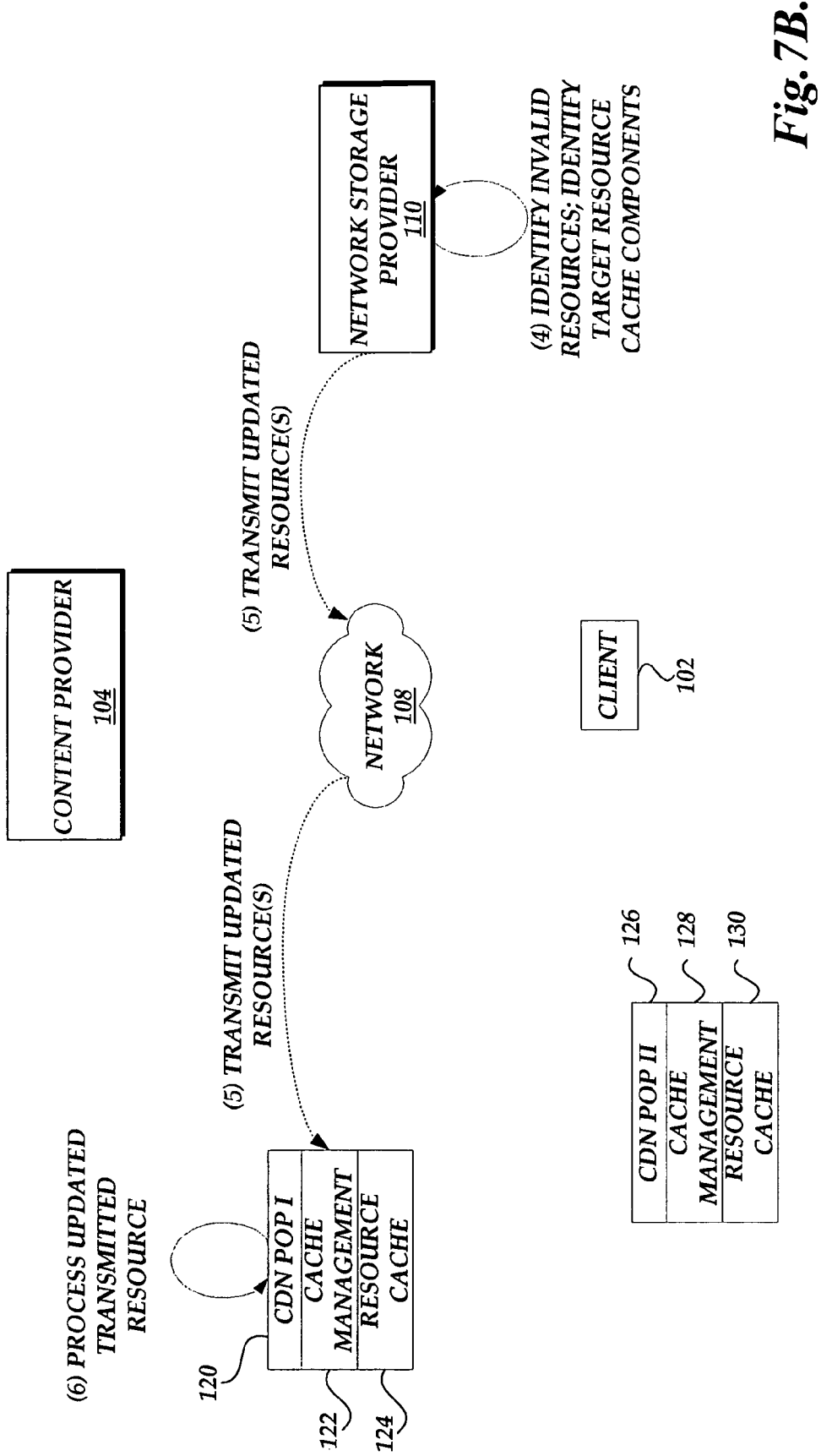

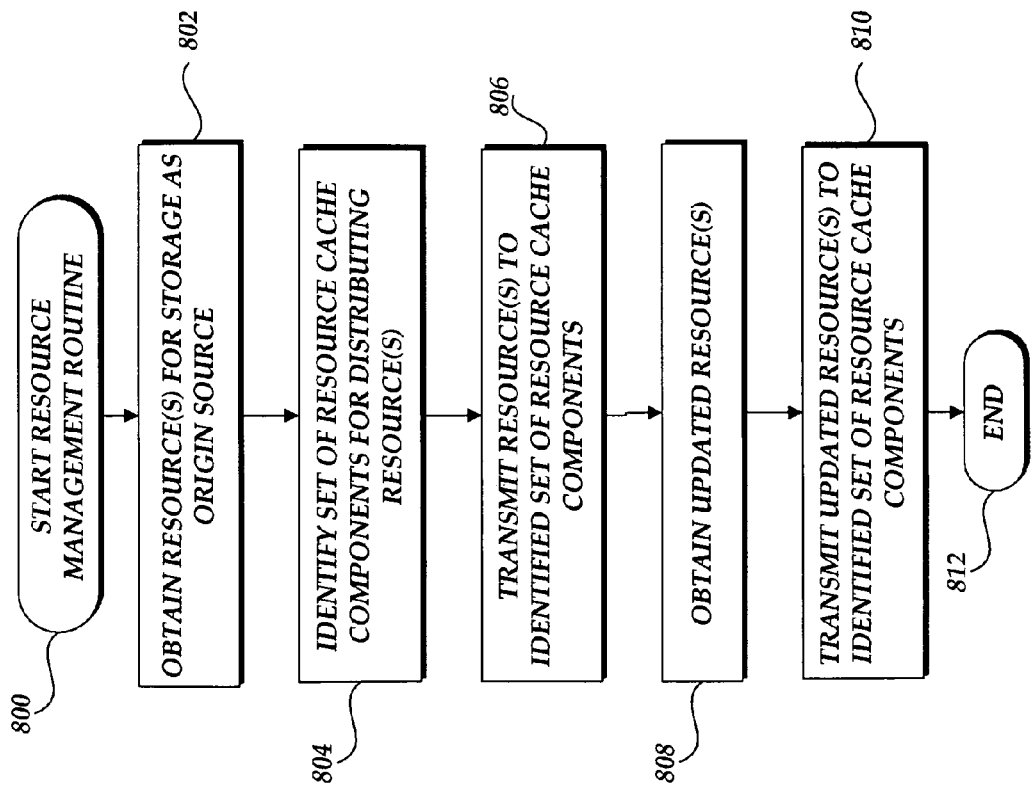

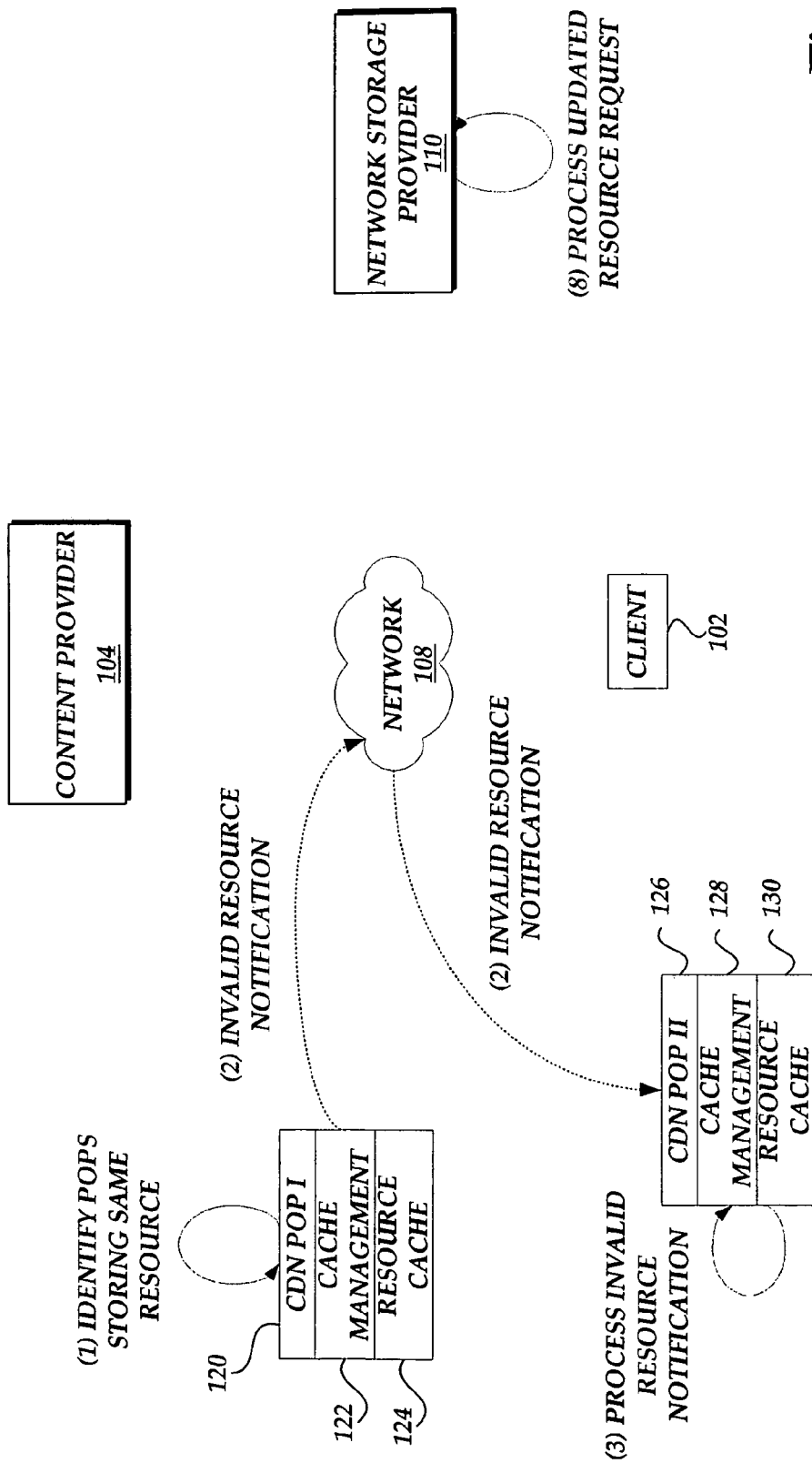

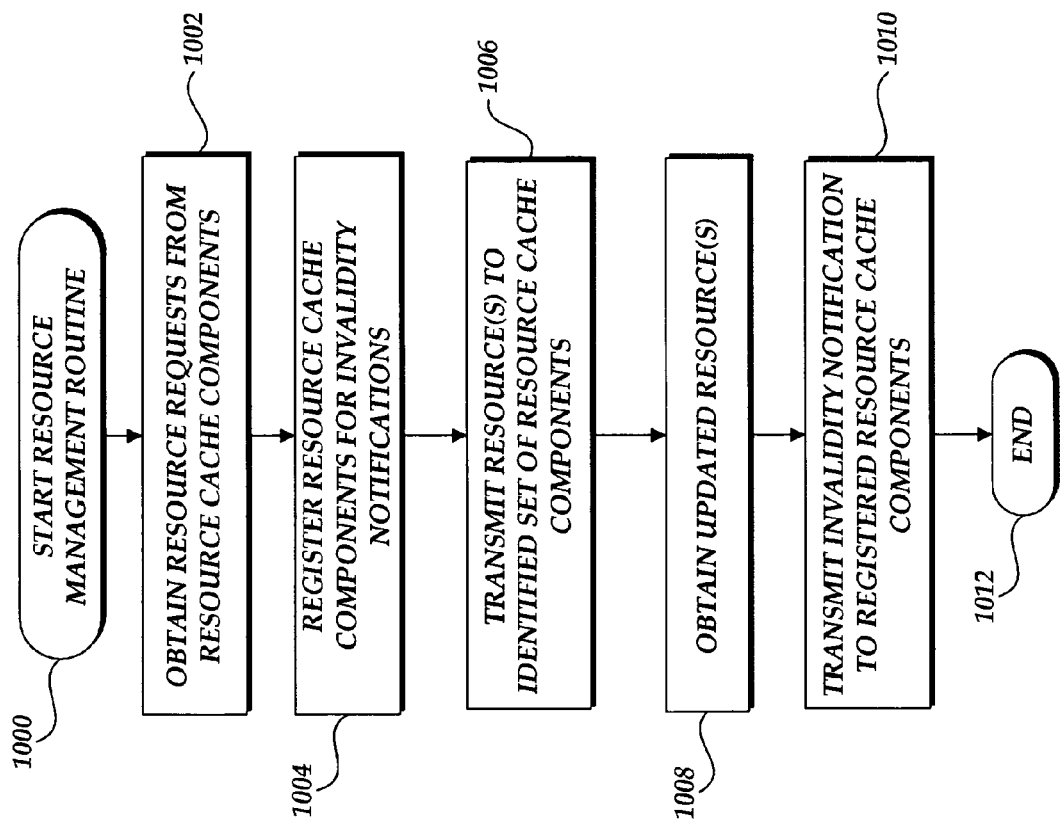

MANAGING TRACKING INFORMATION ENTRIES IN RESOURCE CACHE COMPONENTS

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices, which can place a strain on the content provider's computing resources. Additionally, the content requested by the client computing devices may be made up of a number of distinct components (e.g., identifiable resources), which can further place additional strain on the content provider's computing resources.

With reference to an illustrative example, a requested Web page, or original content, may be associated with a number of additional resources, such as images or videos, which are to be displayed with, or as part of, the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider(s) (or any service provider on behalf of the content provider(s)) would provide client computing devices data associated with the Web page and/or the data associated with the embedded resources.

Some content providers attempt to facilitate the delivery of requested content, such as Web pages and/or resources identified in Web pages, through the utilization of a network storage provider or a content delivery network ("CDN") service provider. A network storage provider and a CDN server provider each typically maintain a number of computing devices, such as resource cache components, in a communication network that can maintain content from various content providers. In turn, content providers can instruct, or otherwise suggest to, client computing devices to request some, or all, of the content provider's content from the network storage provider's or CDN service provider's computing devices.

In some scenarios, resources that have been provided to storage service providers or CDN providers can be updated by the content provider (or other party) or otherwise are considered by the content provider to no longer be valid. In such scenarios, storage providers and CDN service providers receive the updated resource (or notification of an invalid resource) and manage each of the cache server components that are distributing the previously provided version of the resource. Because of the distributed nature of content providers, storage service providers, and CDN service providers, CDN service providers are often required to implement some type of functionality to manage the invalidation of previously provided resources with updated resources. In one embodiment, resource cache components can associate a time to refresh with the resources maintained at the resource cache components. Upon expiration of the time to refresh, the resource cache component requests the resource from the origin source (e.g., a content provider or a network storage provider) and replaces the previous version of the resource with an updated version of the resource or otherwise resets the time to refresh parameters. However, management of resources utilizing time to refresh parameters can be inefficient. In one aspect, associating shorter time to refresh parameters to resources can become burdensome by the increased frequency of update requests transmitted by the resource cache components. In another aspect, associating longer time to refresh parameters can increase the likelihood that the resource cache components continue to distribute invalid, expired or incorrect resources before obtaining the updated resources from the origin source.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A and 3B are block diagrams of the content delivery environment of FIG. 1 illustrating the management of resources by a CDN service provider;

FIGS. 5A and 5B are block diagrams of the content delivery environment of FIG. 1 illustrating the management of resources by a CDN service provider;

FIGS. 7A and 7B are block diagrams of the content delivery environment of FIG. 1 illustrating the management of resources by a CDN service provider and a network storage provider;

FIG. 8 is a flow diagram illustrative of a content management routine implemented by a network storage provider;

FIGS. 9A-9E are block diagrams of the content delivery environment of FIG. 1 illustrating the management of resources by a CDN service provider and a network storage provider; and FIG. 10 is a flow diagram illustrative of a content management routine implemented by a network storage provider.

DETAILED DESCRIPTION

Generally described, the present disclosure is directed to managing of content, such as resources, maintained and provided by content delivery network ("CDN") service providers. Specifically, aspects of the disclosure will be described with regard to the management of content stored by CDN service providers in one or more resource cache component to facilitate the invalidation of specific resources. In a specific embodiment, a network storage provider serves as the origin source, or origin server, of the resources maintained in the resource cache components of the CDN service provider. Accordingly, various embodiments will be described related to the management of resources maintained in the resource cache components of a CDN server provider upon the receipt of updated resource, or the updating of resources, by a network storage component.

Although the present disclosure will be described with regard to illustrative examples and embodiments, one skilled in the art will appreciate that the disclosed embodiments and examples should not be construed as limiting. Further, although the present disclosure will be described with relation to both CDN service providers and network storage providers, one skilled in the relevant art will appreciate that the present disclosure may be implemented by different entities or less than all the identified entities. Still further, various embodiments will be described for the management of resources. The various embodiments may be practiced in combination or individually and the embodiments should not be construed as requiring any particular combination or excluding any combination unless specifically identified in the disclosure.

Figure 1:
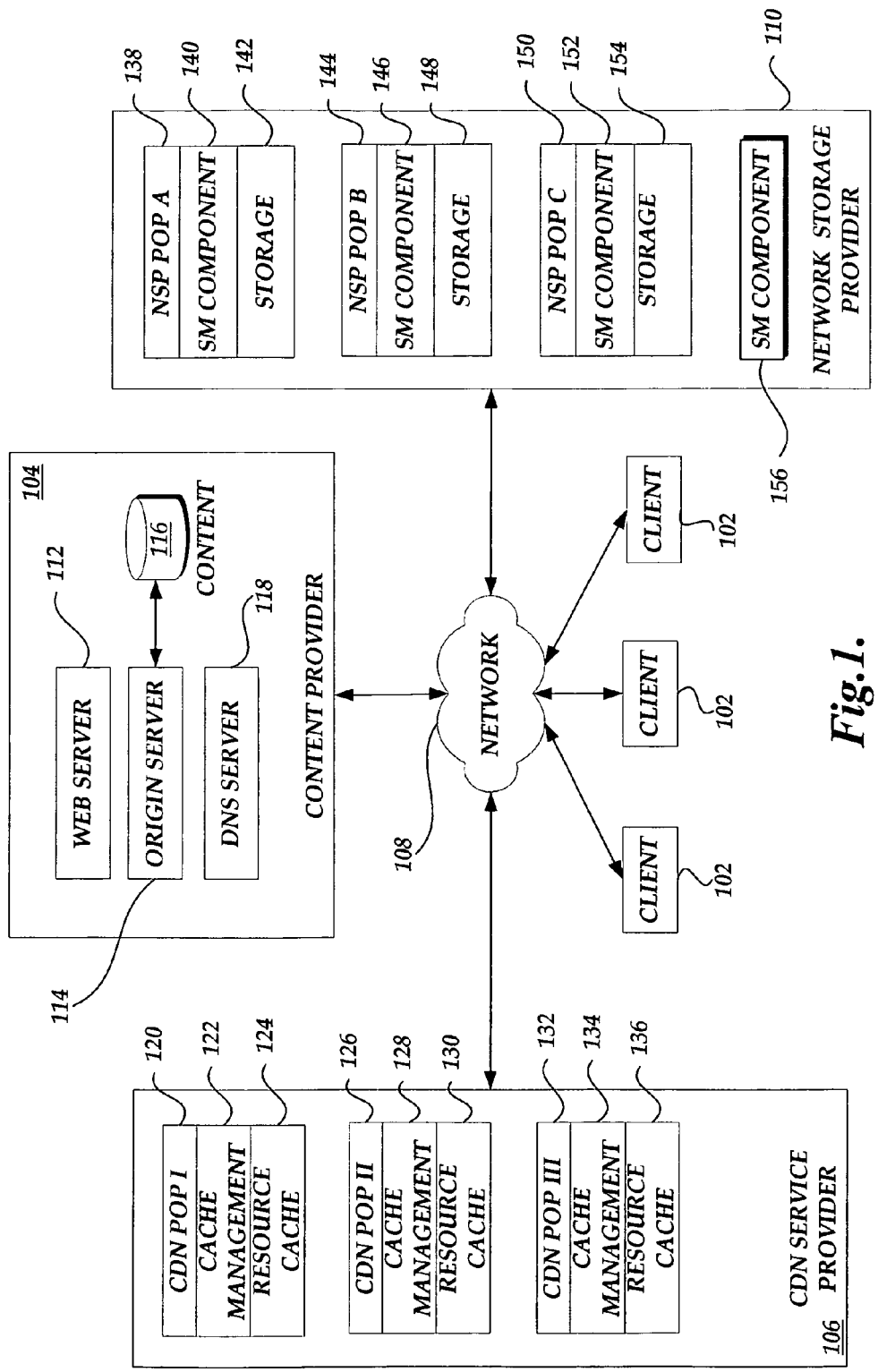
FIG. 1 is a block diagram illustrative of content delivery environment including a number of client computing devices, content provider, a network storage provider, and a content delivery network service provider.

FIG. 1 is a block diagram illustrative of content delivery environment 100 for the managing registration of content with a CDN service provider and subsequent processing of content requests. As illustrated in FIG. 1, the content delivery environment 100 includes a number of client computing devices 102 (generally referred to as clients) for requesting content from a content provider, a network storage provider 110, and/or a CDN service provider 106. The client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. Additionally, although not illustrated in FIG. 1, each client computing device 102 utilizes some type of local DNS resolver component, such as a DNS nameserver, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources, DNS nameservers, and the like. For example, as further illustrated in FIG. 1, the content provider 104 can be associated with one or more DNS nameserver components 118 that would receive DNS queries associated with the domain of the content provider 104 and be authoritative to resolve client computing device DNS queries corresponding to a domain of the content provider 104 (e.g., return an IP address responsive to the DNS query). A DNS nameserver component is considered to be authoritative to a DNS query if the DNS nameserver can completely resolve the query by providing a responsive IP address.

With continued reference to FIG. 1, the content delivery environment 100 can further include a CDN service provider 106 in communication with the one or more client computing devices 102, the content provider 104, and the network storage provider 110 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 120, 126, 132 that correspond to nodes on the communication network 108. Each POP 120, 126, 132 includes a content management component 122, 128, 134 for managing resources provided by the content provider 104 or network storage provider as will be described below. Each POP 120, 126, 132 also includes a resource cache component 124, 130, 136 made up of a number of cache server computing devices for storing resources from content providers or network storage providers and transmitting various requested resources to various client computers. Although not illustrated, each POP can also include additional hardware and software component for facilitating the processing of resource requests from client, such as DNS components for processing DNS queries and load balancing or load sharing software/hardware components for managing resource requests.

In an illustrative embodiment, the content management component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, client request distribution process, and the like.

With further continued reference to FIG. 1, the content delivery environment 100 can also include a network storage provider 110 in communication with the one or more client computing devices 102, the CDN service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 144, 150 that correspond to nodes on the communication network 108. In some embodiments, the NSP POP 138, 144, 150 can include a storage management ("SM") component 140, 146, 152 for processing resource cache component consistency check requests, transmitting update information to the resource cache components, distributing resources to various resource cache components, or processing registrations for resources provided by resource cache components. The functionality implemented by the SM components 140, 146, 152 may vary according to the content management functionality implemented by the storage service provider 110 or the CDN service provider 106.

Each NSP POP 138, 144, 150 also includes a storage component 142, 148, 154 made up of a number of storage devices for storing resources from content providers which will be processed by the network storage provider 110 and transmitted to various client computers. The storage components 142, 148, 154 may further include additional software and/or hardware components that facilitate communications including, but not limited to, load balancing or load sharing software/hardware components. In an illustrative embodiment, the storage components 142, 148, 154 are considered to be logically grouped, regardless of whether the components, or portions of the components, are physically separate. Additionally, the network storage provider 110 may include a stand alone SM component 156 that provides CDN service provider recommendations to content providers 104, such as via a Web service.

Additionally, although the NSP POPs 138, 144, 150 are illustrated in FIG. 1 as logically associated with the network storage provider 110, the NSP POPs will be geographically distributed throughout the communication network 108 in a manner to best serve various demographics of client computing devices 102. Additionally, the network storage provider 110 can be associated with various additional computing resources, such additional computing devices for administration of content and resources, DNS nameservers, and the like. For example, the network storage provider 110 can be associated with one or more DNS nameserver components that are operative to receive DNS queries related to registered domain names associated with the network storage provider 110. The one or more DNS nameservers can be authoritative to resolve client computing device DNS queries corresponding to the registered domain names of the network storage provider 110. As similarly set forth above, a DNS nameserver component is considered to be authoritative to a DNS query if the DNS nameserver can resolve the query by providing a responsive IP address. Even further, the components of the network storage provider 110 and components of the CDN service provider 106 can be managed by the same or different entities.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-6, an embodiment illustrating the interaction between various components of the content delivery environment 100 of FIG. 1 will be described. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2A:
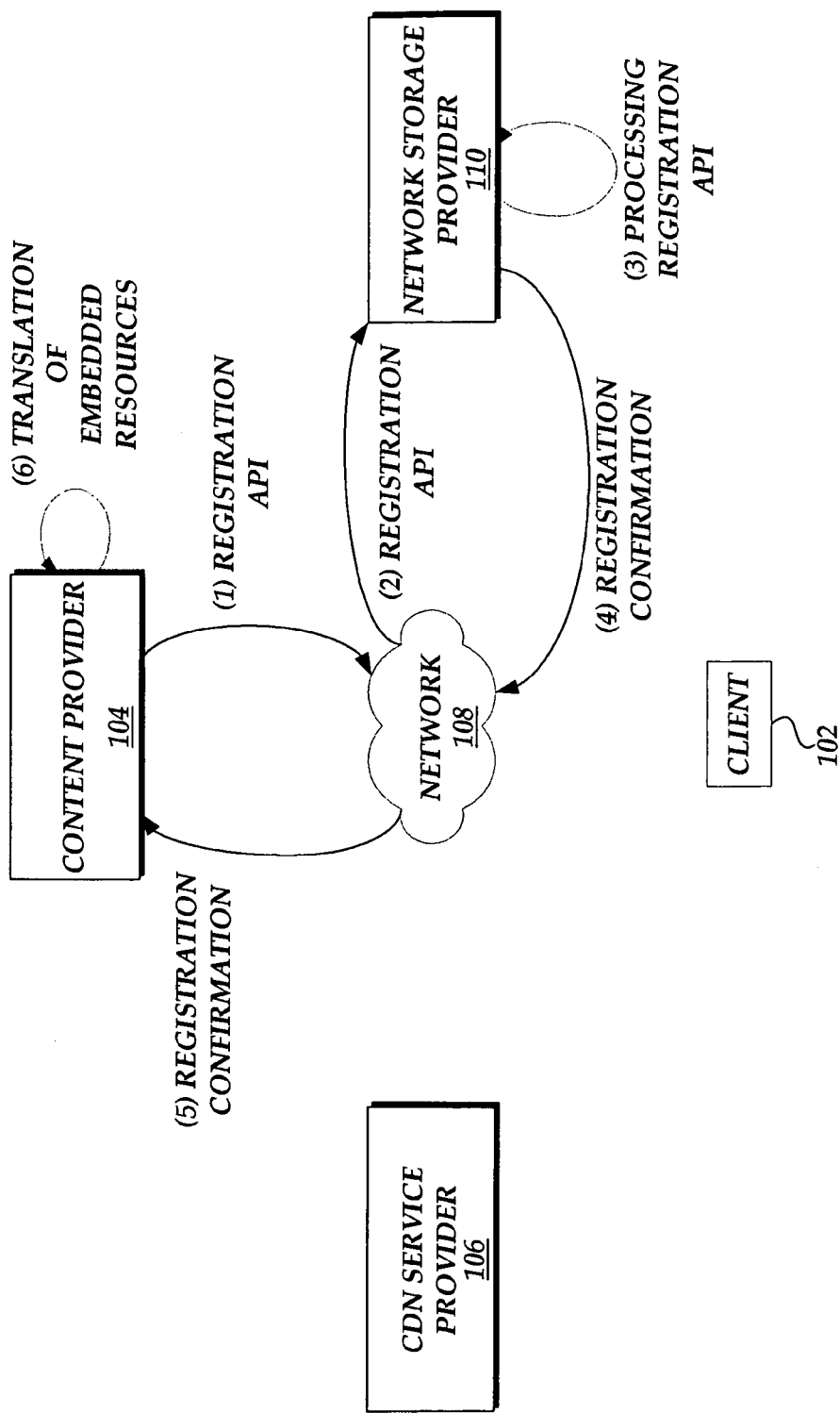
FIGS. 2A and 2B are block diagrams of the content delivery environment of FIG. 1 illustrating the registration of a content provider with a network storage provider and the processing of resource requests from a client computing device.

With reference to FIG. 2A, an illustrative interaction for registration of a content provider 104 with the network storage provider 110 will be described. As illustrated in FIG. 2A, the storage provider content registration process begins with registration of the content provider 104 with the network storage provider 110. In an illustrative embodiment, the content provider 104 utilizes a registration application program interface ("API") to register with the network storage provider 110 such that the network storage provider 110 can provide content on behalf of the content provider 104. The registration API includes the identification of the origin server 114 of the content provider 104 that will provide requested resources to the network storage provider 110. In addition or alternatively, the registration API includes the content to be stored by the network storage provider 110 on behalf of the content provider 104.

One skilled in the relevant art will appreciate that upon storage of the content by the network storage provider 110, the content provider 104 can begin to direct requests for content from client computing devices 102 to the network storage provider 110. Specifically, in accordance with DNS routing principles, a client computing device DNS request corresponding to a resource identifier would eventually be directed toward a storage component 140, 144, 148 of a NSP POP 138, 142, 146 associated with the network storage provider 110 (e.g., resolved to an IP address corresponding to a storage component).

In an illustrative embodiment, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats.

The network storage provider 110 returns an identification of applicable domains for the network storage provider (unless it has been previously provided) and any additional information to the content provider 104. In turn, the content provider 104 can then process the stored content with content provider specific information. In one example, the content provider 104 translates resource identifiers originally directed toward a domain of the origin server 114 to a domain corresponding to the network storage provider 110. The modified URLs are embedded into requested content in a manner such that DNS queries for the modified URLs are received by a DNS nameserver corresponding to the network storage provider 110 and not a DNS server corresponding to the content provider 104.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the modified URLs resolve to a POP associated with the network storage provider 110. In one embodiment, the modified URL identifies the domain of the network storage provider 110 (e.g., "storageprovider.com"), the same name of the resource to be requested (e.g., "resource.xxx") and the same path where the resource will be found (e.g., "path"). Additionally, the modified URL can include additional processing information (e.g., "additional information"). The modified URL would have the form of:

http://additional information.storageprovider.com/path/resource.xxx

In another embodiment, the information associated with the network storage provider 110 is included in the modified URL, such as through prepending or other techniques, such that the modified URL can maintain all of the information associated with the original URL. In this embodiment, the modified URL would have the form of:

http://additional information.storageprovider.com/www-.contentprovider.com/path/resource.xxx After completion of the registration and translation processes illustrated in FIG. 2A, a client computing device 102 subsequently generates a content request that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers will generally in the form of the modified URLs, described above.

Figure 2B:
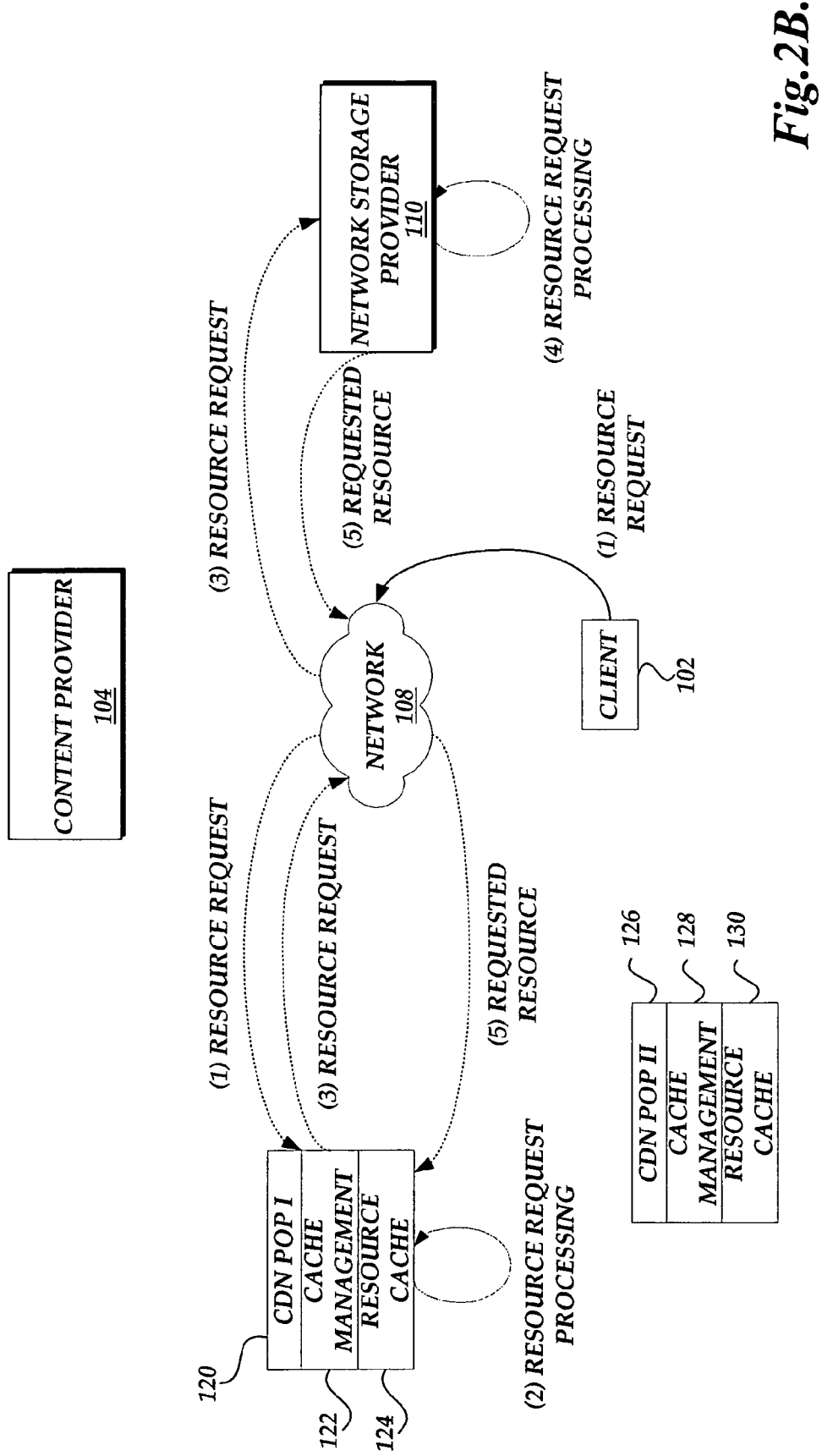

With reference now to FIG. 2B, upon receipt of the requested content, the client computing device 102, such as through a browser software application, begins processing any of the markup code included in the content and attempts to acquire the resources identified by the embedded resource identifiers (e.g., the embedded, modified URLs). Although not illustrated in FIG. 2B (or will be described in detail), the acquisition of the identified resources begins with the issuance of DNS queries by the client computing device 102 that are resolved by identifying an IP address corresponding to a CDN service provider POP that will attempt to provide the subsequently requested content. For purposes of illustration in FIG. 2B, it is assumed that the client computing device 102 has been provided the IP address of POP I 120. Accordingly, the client computing device 102 can begin issuing content requests, such as requests corresponding to the hypertext transfer protocol ("HTTP"), to POP I 120, which in turn are processed by the resource cache component 124. If a requested resource is maintained by the resource cache component 124, the resource cache component can provide the requested resource to the client computing device 102.

Alternatively, if the resource cache component 124 does not maintain the requested resource, as illustrated in FIG. 2B, the resource cache component transmits a resource request to the origin source identified in the resource request, such as in a URL corresponding to the resource request or via information maintained by the resource cache component. For purposes of illustration, it is assume that storage service provider 110 operates as the origin source, or origin server, for the requested resource on behalf of the content provider 104. The storage service provider 110, or NSP POP, processes the resource request and provides the requesting resource cache component with the requested resource. The resource cache component 124 can then provide the client computing device 102 with the requested resource. Additionally, the resource cache component 124 can maintain, or cache, the requested resource for processing subsequent requests for the resource without requiring the resource cache component to request the resource from the storage service provider 110.

Figure 3B:
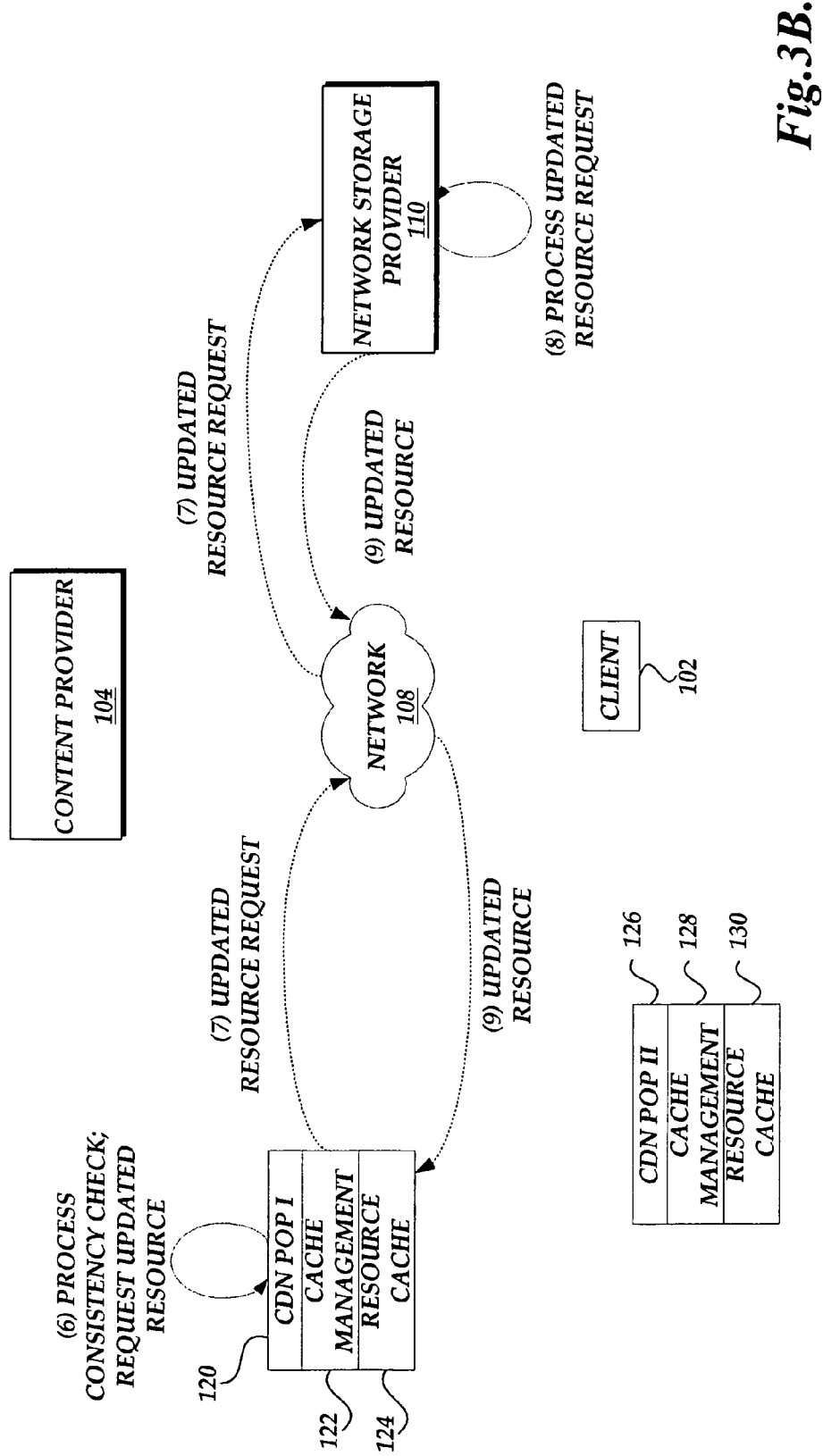

Turning now to FIGS. 3A and 3B, an embodiment for the management of resources provided by the network storage provider 110 will be described. With reference to FIG. 3A, after receipt of the resource from the network storage provider 110 (FIG. 2B), the resource cache component 124 stores the resource and makes the resource available to delivery to any client subsequently requesting the resource. Additionally, the cache management component 122 updates tracking information associated with resources maintained in the resource cache component 124. In an illustrative embodiment, the tracking information can correspond to an inode data structure. One skilled in the relevant art will appreciate that an inode data structure corresponds to a data structure utilized to store information about an object, such as file or resource. Such information can be referred to as metadata. Each resource is associated with an inode number that uniquely corresponds to the resource (or a grouping of resources) among other resources maintained in the resource cache component. The cache management component maintains inode numbers in which the information about a resource can be accessed by reference to its corresponding inode number. For example, the inode numbers can be maintained in a table or an array format. In another example, the inode numbers can be maintained in a tree structure format, such as a radix tree or Patricia Trie.

In this illustrative embodiment, the information associated with each inode corresponds to expiration criteria, the satisfaction of which is indicative that the inode can no longer be considered valid. Examples of expiration can include, but are not limited to, a time of day, a total time expired since storing the resource (or refreshing a count), occurrence of other identifiable events, and the like. The expiration data may be specified by the cache management component 122 as the resource is received. Additionally, the expiration data may also be specified, at least in part, by the network storage provider 110. Further, the expiration data may be dynamically updated by the cache management component 122 or network storage provider (or other component) based on communication network bandwidth, a number of pending requests received by the network storage provider 110, a number of requests being transmitted by the cache management component 122, and the like.

As illustrated in FIG. 3A, based on monitoring and analyzing expiration criteria and determining that the expiration criteria has been satisfied, the cache management component 122 can transmit a consistency check request to the network storage provider 110. In an illustrative embodiment, the consistency check request corresponds to a request to determine whether invalidity information maintained by the network storage provider 110 is indicative that the corresponding resource should be invalidated.

In a specific embodiment, the network storage provider maintains invalidity information identifying resource validity. The network storage provider 110 transmits the results of the consistency check to the cache management component 122. The results of the consistency check can include information indicating that the inode is no longer valid. Additionally, or alternatively, the results of the consistency check can include information that is processed by the cache management component 122 to determine whether the inode is valid. For example, the results of the consistency check can correspond to blocks of data used to update the information stored in the inode data structure. Accordingly, a determination of whether the information identifying the inode as valid or invalid would not be available until after the processing and incorporation of such update information.

With reference now to FIG. 3B, the cache management component 122 processes the consistency check information to determine whether the inode is to be considered valid or invalid. If the inode is considered to be valid, the cache management component 122 does not need to perform additional activity with regard to the requested resource. Accordingly, the cache management component 122 can either rest the expiration criteria or otherwise obtain, or generate, updated expiration criteria. Alternatively, if the inode is determined to be invalid, the cache management component 122 determines that the corresponding resource, or set of resources, is also invalid. Accordingly, as illustrated in FIG. 3B, the cache management component transmits a request for an updated resource. The request can then be processed by the network storage component, which provides the updated resource, or set of resources. The resource management component can then process the incoming updated resources in a manner as described with regard to FIG. 2A.

Figure 4A:
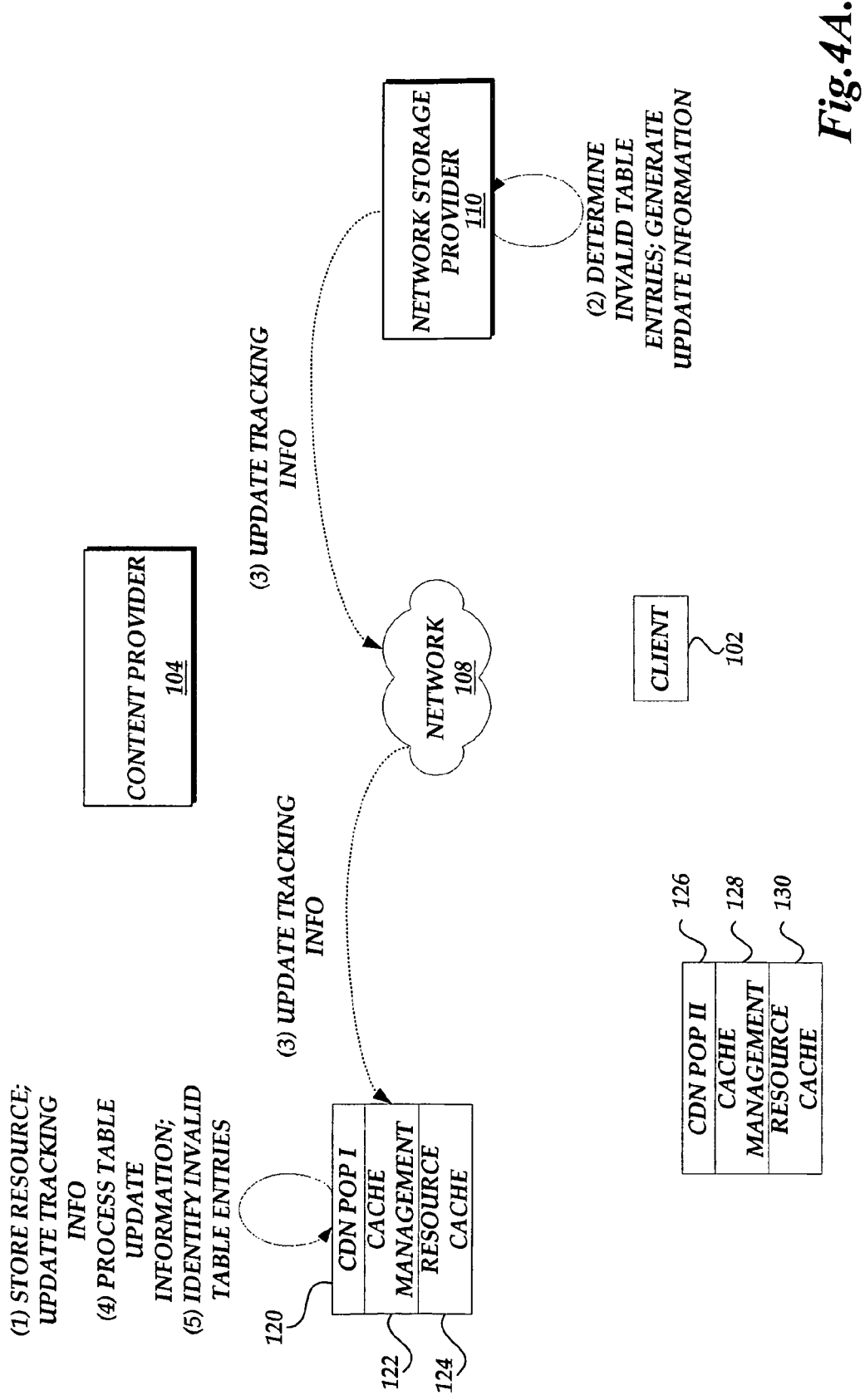
FIGS. 4A and 4B are block diagrams of the content delivery environment of FIG. 1 illustrating the management of resources by a CDN service provider.
Figure 4B:
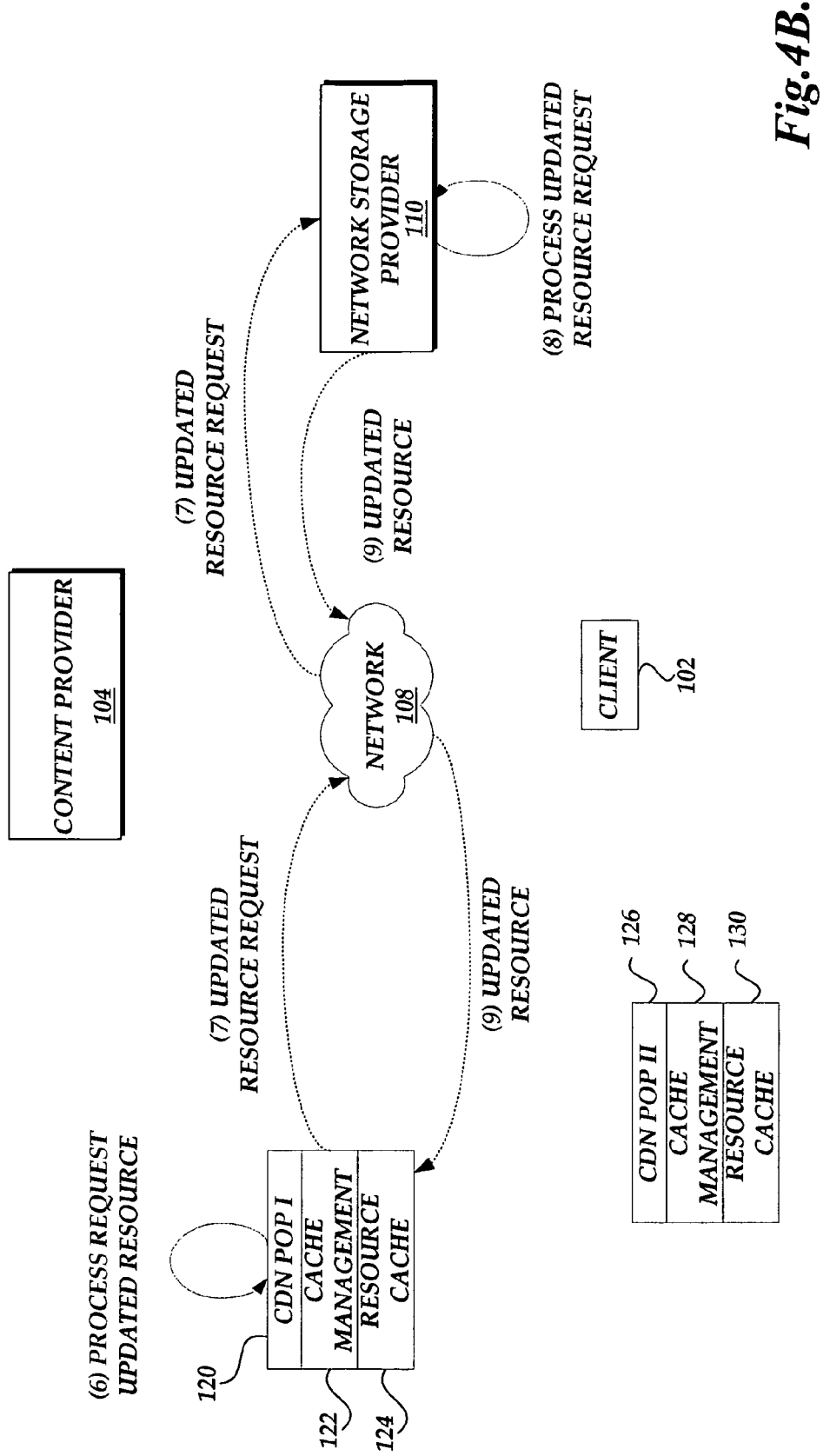

Turning now to FIGS. 4A and 4B, an embodiment for the management of resources provided by the network storage provider 110 will be described. Similar to the interaction described with regard to FIG. 3A, as illustrated in FIG. 4A, after receipt of the resource from the network storage provider 110 (FIG. 2B), the resource cache component 124 stores the resource and makes the resource available to delivery to any client subsequently requesting the resource. Additionally, the cache management component 122 updates tracking information associated with resources maintained in the resource cache component 124. As also previously described with regard to FIG. 3A, the tracking information can correspond to an inode data structure organized such that the cache management component 122 maintains inode numbers for stored resources. Additionally, the cache management component 122 maintains the inode information in a tree structure format, such as a radix tree or Patricia Trie.

As illustrated in FIG. 4A, upon the determination that one or more resources are invalid, the network storage provider 110 updates an index, or other mapping, of the inodes. Specifically, the network storage provider 110 identifies that inodes corresponding to resources that are invalid or otherwise need to be updated, generally referred to as the update information. The storage network provider then transmits the update information to the cache management component 122. Upon receipt, the cache management component 122 can process the update information and utilize the tree structure format, such as the radix tree or Patricia Trie, identify invalid inodes.

With reference now to FIG. 4B, the cache management component 122 can utilize the inode information to process the resources maintained in the resource cache component 124. If the inode is considered to be valid, the cache management component 122 does not need to perform additional activity with regard to the requested resource. Accordingly, the cache management component 122 can either rest the expiration criteria or otherwise obtain, or generate, updated expiration criteria. Alternatively, if the inode is determined to be invalid, the cache management component 122 determines that the corresponding resource, or set of resources, is also invalid. Accordingly, in one embodiment illustrated in FIG. 4B, the cache management component transmits a request for an updated resource. The request can then be processed by the network storage component, which provides the updated resource, or set of resources. The resource management component can then process the incoming updated resources in a manner as described with regard to FIG. 2A. Alternatively, the cache management component 122 can process the determination of invalidity of the inode without transmitting the request for the updated resource.

Figure 5B:
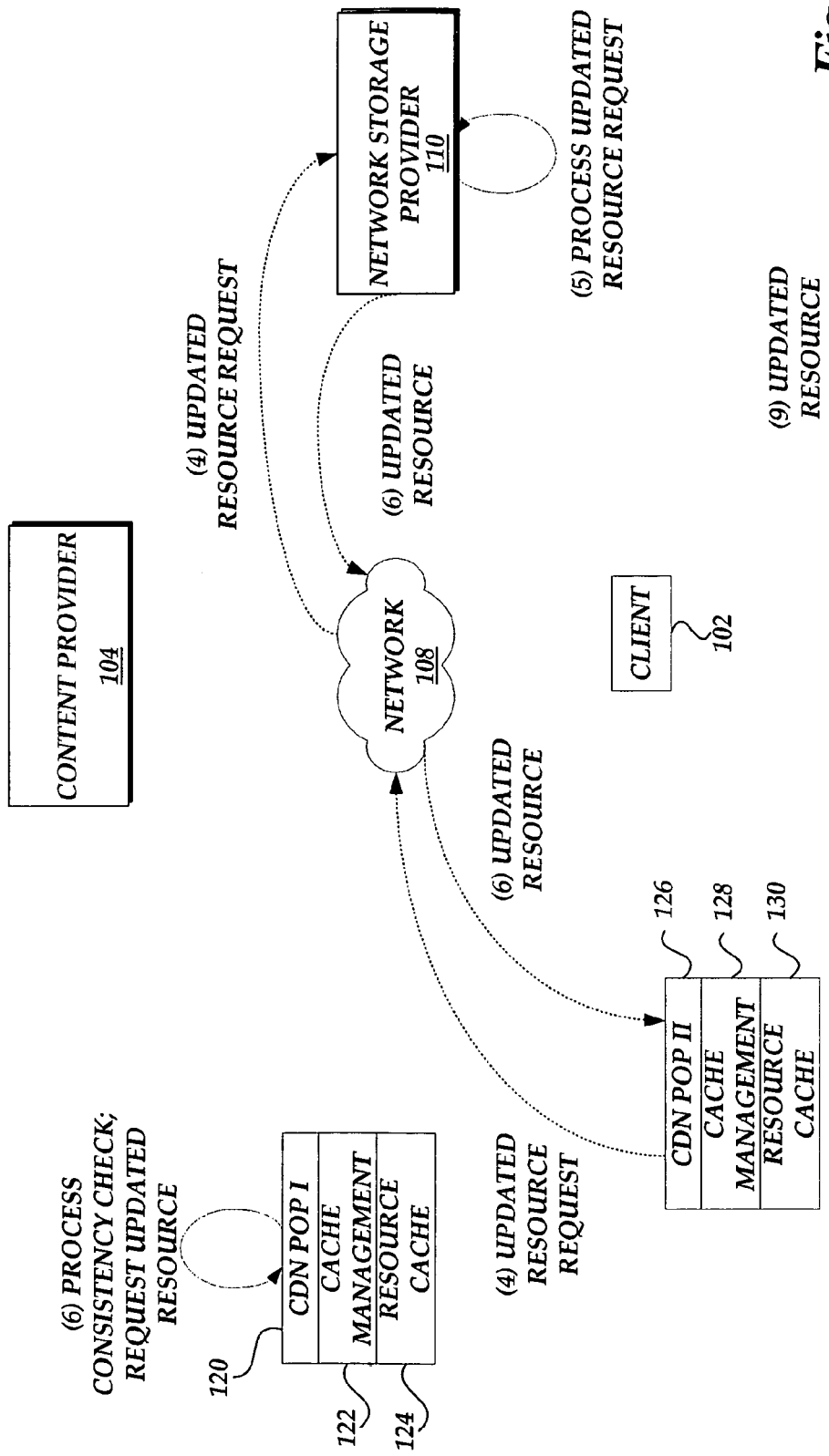

With reference now to FIGS. 5A and 5B, in one embodiment, the cache management component 122 can also be utilized to further distribute information regarding the invalidation of inodes. The interaction described with regard to FIGS. 5A and 5B can be implemented in conjunction with either the interaction described with regard to FIGS. 3A and 3B, FIGS. 4A and 4B, or any other interaction in which inodes are identified as invalid (or the corresponding resource). With reference to FIG. 5A, in an illustrative embodiment, the inode data structure can be utilized to identify other resource cache components that may also be maintained the previous version of the resource that has been identified as invalid. Accordingly, the cache management component 122 utilizes the information stored in the inode data structure to identify one or more resource cache components that have the resource. In an illustrative embodiment, the CDN service provider 106 may maintain master lists or partial master lists of commonly maintained resources among the various POPs. For example, the CDN service provider 106 may facilitate the synchronization of inode information across multiple cache management components. Additionally, or alternatively, the various cache management components may utilize peer-to-peer distribution techniques to exchange information related to inode information. For example, the cache management components may implement a Gossip protocol, or other communication protocol, for the distribution of information across a distributed network, such as the network of POPs associated with the CDN service provider 106. As illustrated in FIG. 5A, cache management component 122 utilizes the information maintained in the inode data structure to transmit invalid resource notifications to other cache management components 128. Although only a single transmission is illustrated, one skilled in the relevant art will appreciate that a single cache management component can transmit multiple invalid resource notifications or utilize one of various peer-to-peer distribution models.

With reference now to FIG. 5B, the receiving cache management component 128 can then component transmits a request for an updated resource. The request can then be processed by the network storage component, which provides the updated resource, or set of resources. The resource management component 128 can then process the incoming updated resources in a manner as described with regard to FIG. 2A. Alternatively, the cache management component 128 may be configured in a manner such that updates are received from the network storage provider 110 only by a designated resource cache component 122. In this embodiment, the cache management component 128 would not need to update any inode information.

With reference now to FIGS. 6A-6D, illustrative flow diagram related to the management of resources in a resource cache component will be described. The various routines will be described with regard to implementation by a cache management component or resource cache component. It will be appreciate that both the cache management component and resource cache component logically correspond to a POP provided by a CDN service provider 106. Accordingly, any particular functionality associated with one of the components could be implemented by the other component, by multiple components or by another component associated with a POP or any component distributed across a communication network 108. Further, although the various routines will be described as being implemented by an illustrative cache management component, the present disclosure should not be construed as requiring a resource cache component to implement all, of specific subsets, of the routines illustrated in FIGS. 6A-6D.

Figure 6A:
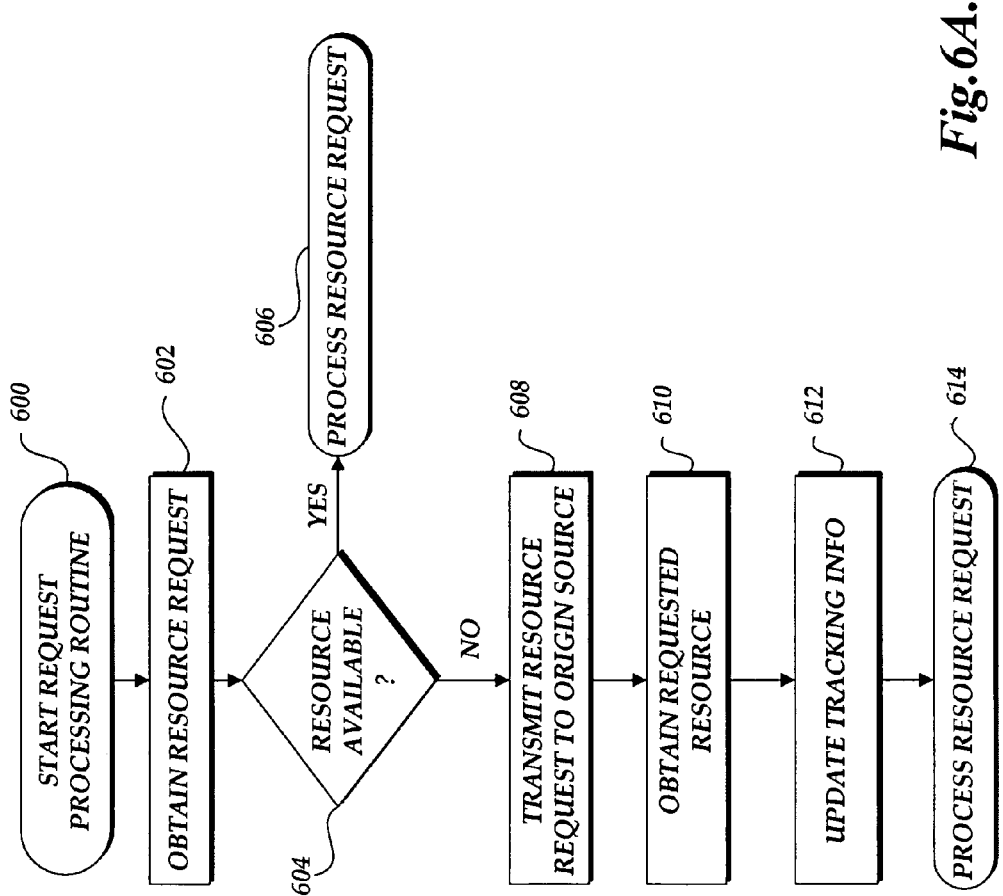
FIGS. 6A-6D are flow diagrams illustrative of various routines implemented by a CDN service provider for management of resources.

With reference to FIG. 6A, a request processing routine 600 implemented by a cache management component will be described. At block 602, the cache management component obtains a resource request. In an illustrative embodiment, the resource request can be transmitted by a client computing device 102. As previously described, the resource request may correspond to a set of resources, such as from a Web page. At decision block 604, a test is conducted to determine whether the requested resource is available at the resource cache component. A determination of whether the resource is available can correspond to a determination of whether a matching resource is currently stored and accessible. Additionally, if the requested resource is stored and accessible, the determination can further include a determination of whether the resource remains valid (such as by timestamp). If so, the resource request is processed at block 600 by transmitting the requested resource to the client device 102.

Alternatively, if the requested resource is not available at the resource cache component, at block 608, the resource cache component (or cache management component) transmits a request for the resource from an origin source. In an illustrative embodiment, the origin source can include other resource cache components provide by the CDN service provider 106. Additionally, the origin source can correspond to one or more NSP POPs provided by a network storage provider 110. Still further, the origin source can correspond to one or more storage locations provided by, otherwise associated with, a content provider 104. At block 610, the resource cache component obtains the requested resource from the origin source. At block 612, the cache management component updates the tracking information utilized to manage the resources stored in the resource cache component. As previously described, the tracking information can be captured by the incorporation of an inode data structure in which one or more resources are represented by an inode number. In an illustrative embodiment, the information maintained in the inode data structure can be provided by the network storage provider 110, generated, or otherwise determined, by the cache management component, or obtained from another source. At block 614, the resource request is processed at block 600 by transmitting the requested resource to the client device 102. The routine 600 terminates.

Figure 6B:
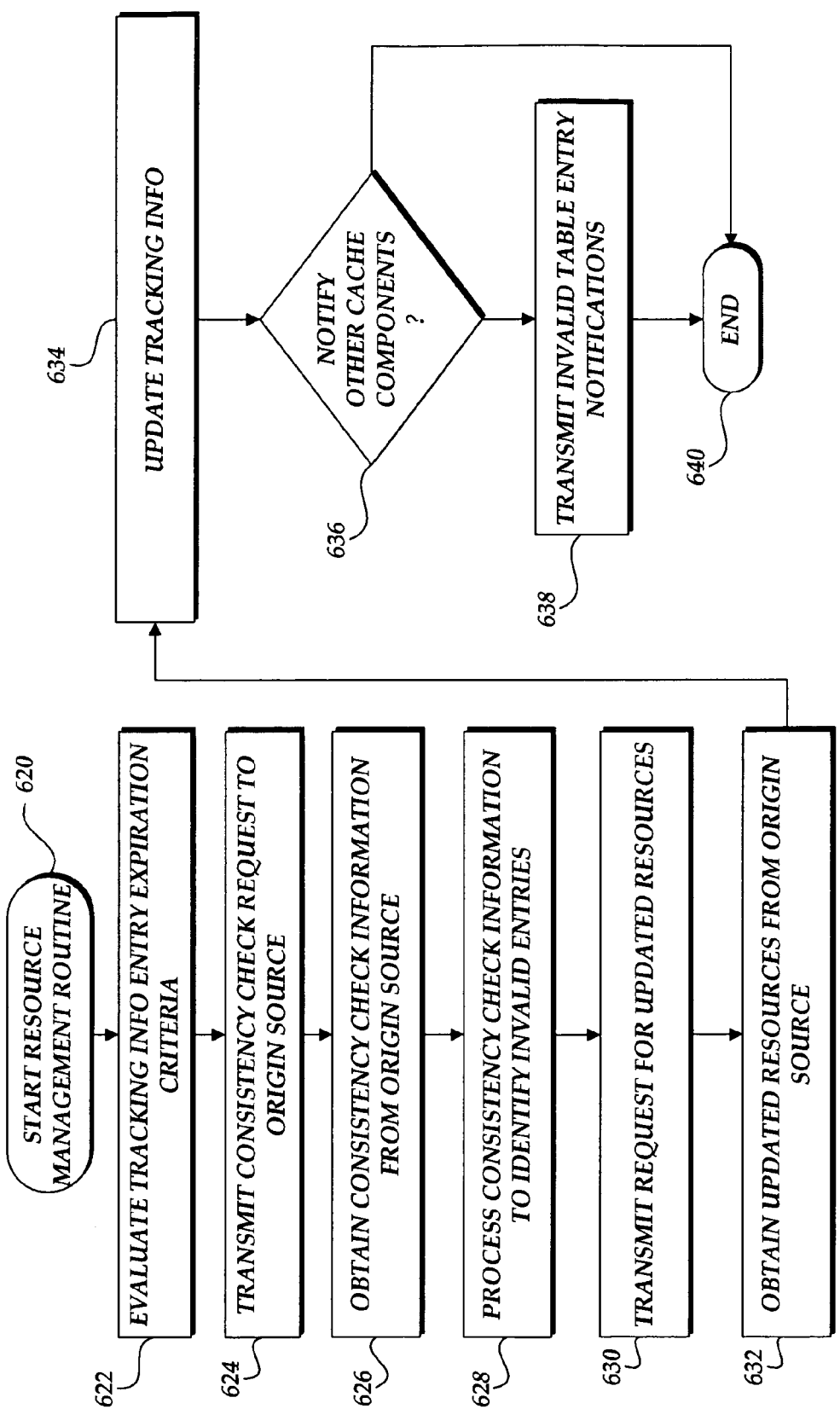

With reference now to FIG. 6B, a resource management routine 620 implemented by a cache management component will be described. In an illustrative embodiment, routine 620 can be utilized to manage resources utilizing tracking information, such as an inode data structure, that includes expiration criteria in a manner illustrated with regard to FIGS. 3A and 3B. At block 622, the cache management component evaluates tracking information expiration criteria. In an illustrative embodiment, the evaluation of the tracking information will depend on the type of expiration criteria, such as timestamps, total time or inferential references. Based on a determination that the expiration criteria have been satisfied for at least one inode, at block 624, the cache management component transmits a consistency check request to the origin source, such as the network storage provider 110. As previously described, in an illustrative embodiment, the consistency check request corresponds to a request to determine whether invalidity information maintained by the network storage provider 110 is indicative that the corresponding resource should be invalidated.

At block 626, the cache management component obtains the consistency check information from a corresponding origin source. At block 628, the cache management component processes the returned consistency check information to identify inode numbers that should be considered to be invalid (or invalid entries). As previously described, the results of the consistency check can include information indicating that the inode is no longer valid. Additionally, or alternatively, the results of the consistency check can include information that is processed by the cache management component 122 to determine whether the inode is valid. For example, the results of the consistency check can correspond to blocks of data used to update the information stored in the inode data structure. Accordingly, a determination of whether the information identifying the inode as valid or invalid would not be available until after the processing and incorporation of such update information. In an alternative embodiment, the cache management component may determine that the satisfaction of the expiration criteria is sufficient to consider the resource invalid. In such an embodiment, the consistency check request would not need to be transmitted.

For invalid tracking information entries, the resource cache component can process the previously maintained resource in a number of ways. In one embodiment, at block 630, the resource cache component can transmit requests for updated resources. The requests for the updated resources can be transmitted to the origin source from which the previous version of the resource was obtained. Alternatively, the consistency check information, or other information maintained in the inode data structure, can identify one or more different origin sources for the resource to be updated. At block 632, the resource cache component obtains the updated sources from the corresponding origin source. At block 634, the cache management component updates the tracking information. In an illustrative embodiment, the updating of the tracking information can include resetting the expiration criteria, substituting new expiration criteria and the like. Additionally, although blocks 630-634 relate to obtaining updated versions of an invalid resource, in different embodiments, the cache management component or resource cache component can designate the resource as stale, invalid, corrupt, unavailable or include warnings that the information may not be accurate.

At decision block 636, a test is conducted to determine whether cache management component should notify other resource cache components associated with other POPs. In an illustrative embodiment, one or more entries in the inode data structure can include information identifying one or more POPs that are believed to store the corresponding resource. If the inode data structure, or other information, does not identify another cache management component, the routine 620 proceeds to block 640. Alternatively, if the inode data structure includes information identifying one or more cache management components to notify of the invalid entry, at block 638, the cache management component transmits an invalid entry notification to the identified cache management components. As previously described, the identification of the cache management components identified in the inode data structures may be provided by the network storage provider 110 or CDN service provider 106. Additionally, the identification of cache management components can also be facilitated through peer-to-peer distribution models. At block 640, the routine 620 terminates.

Figure 6C:
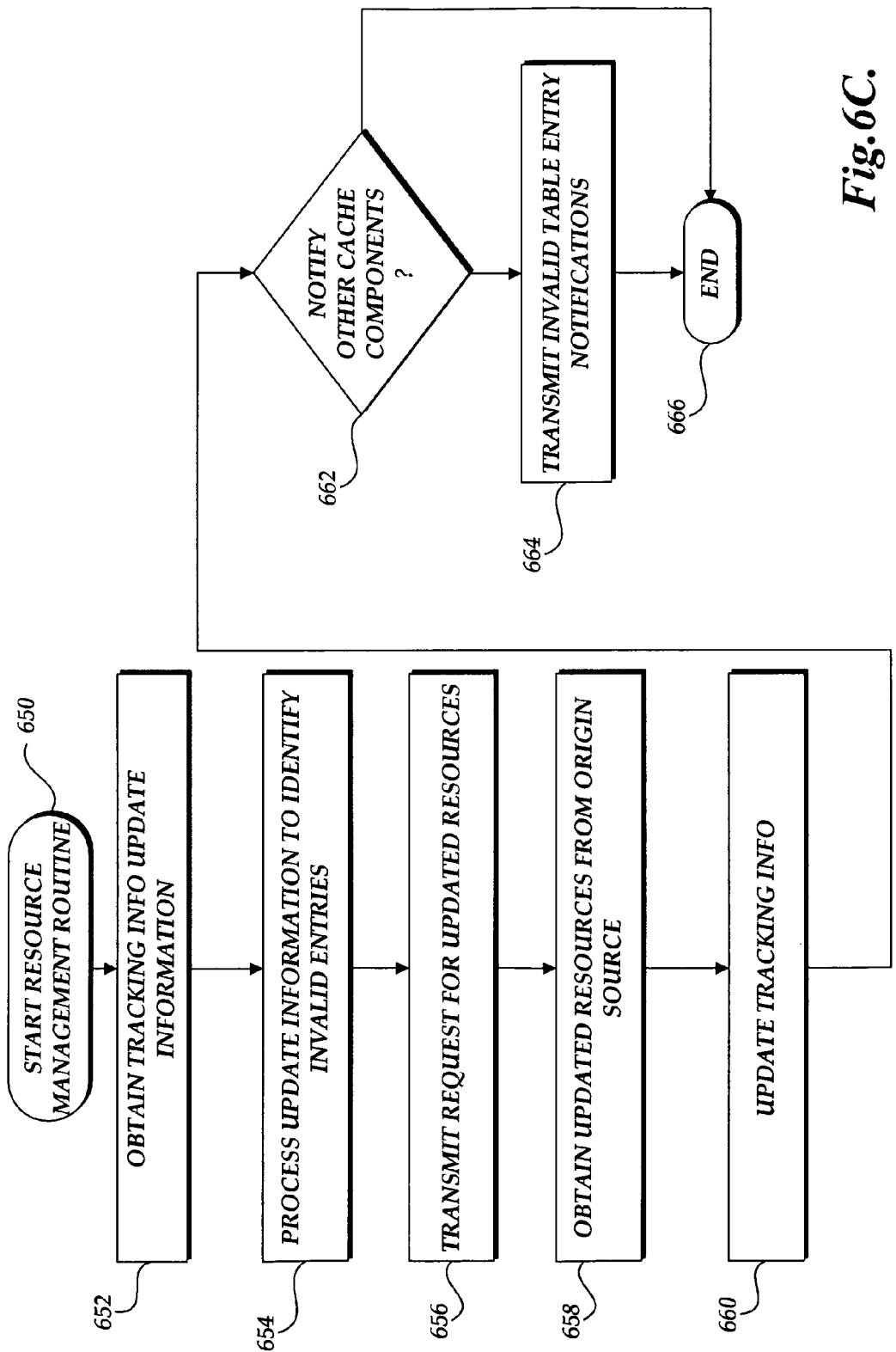

With reference now to FIG. 6C, a resource management routine 650 implemented by a cache management component will be described. In an illustrative embodiment, routine 650 can be utilized to manage resources utilizing tracking information, such as an inode data structure, and update information provided by an origin source, such as network storage provider 110, management component of a CDN service provider 106, or other third party. Such an embodiment was illustrated with regard to FIGS. 4A and 4B. At block 652, the cache management component obtains the update information from a corresponding origin source. In an illustrative embodiment, the update information identifies inodes that are determined to be invalid without requiring the transmission of the consistency check. At block 654, the cache management component processes the returned update information to identify inode numbers that should be considered to be invalid (or invalid entries). As previously described, the inode data structure can be maintained in a tree structure that facilitates the identification of invalid entries.

For invalid tracking information entries, the resource cache component can process the previously maintained resource in a number of ways. In one embodiment, at block 656, the resource cache component can transmit requests for updated resources. The requests for the updated resources can be transmitted to the origin source from which the previous version of the resource was obtained. Alternatively, the update information, or other information maintained in the inode data structure, can identify one or more different origin sources for the resource to be updated. At block 658, the resource cache component obtains the updated sources from the corresponding origin source.

At block 660, the cache management component updates the tracking information. In an illustrative embodiment, the updating of the tracking information can include resetting the expiration criteria, substituting new expiration criteria and the like. Additionally, although blocks 656-660 relate to obtaining updated versions of an invalid resource, in different embodiments, the cache management component or resource cache component can designate the resource as stale, invalid, corrupt, unavailable or include warnings that the information may not be accurate. At decision block 662, a test is conducted to determine whether cache management component should notify other resource cache components associated with other POPs. In an illustrative embodiment, one or more entries in the inode data structure can include information identifying one or more POPs that are believed to store the corresponding resource. If the inode data structure, or other information, does not identify another cache management component, the routine 650 proceeds to block 666. Alternatively, if the inode data structure includes information identifying one or more cache management components to notify of the invalid entry, at block 638, the cache management component transmits an invalid entry notification to the identified cache management components. Additionally, the identification of cache management components can also be facilitated through peer-to-peer distribution models. At block 666, the routine 650 terminates.

Figure 6D:
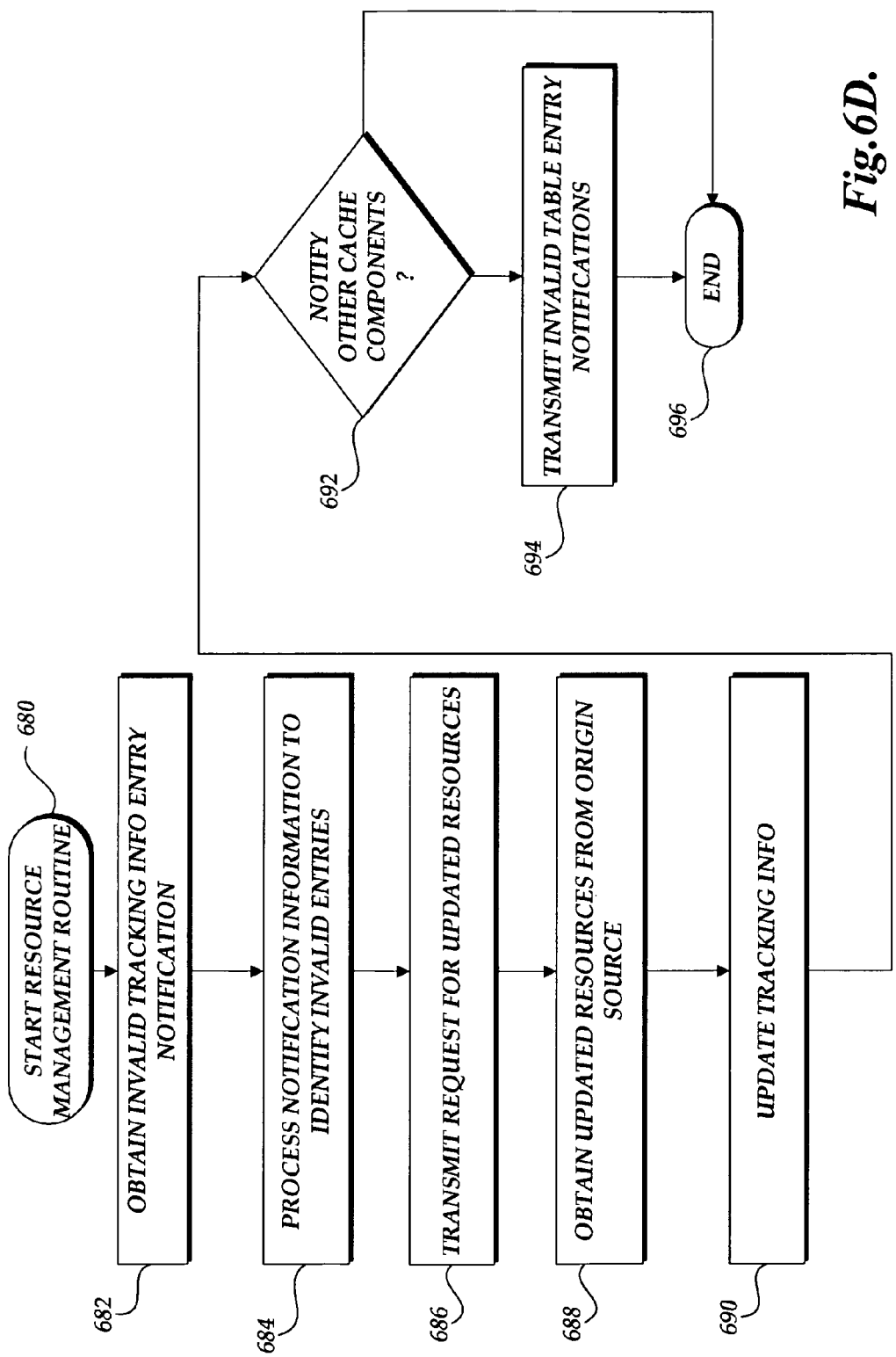

With reference now to FIG. 6D, a resource management routine 680 implemented by a cache management component will be described. In an illustrative embodiment, routine 680 can be utilized to manage resources utilizing tracking information, such as an inode data structure, based on an invalid tracking information notification received from another cache management component. An embodiment of this interaction was illustrated with regard to FIGS. 5A and 5B. At block 682, the cache management component obtains the invalid tracking information entry notification from another cache management component. At block 684, the cache management component processes the invalid tracking information notification to identify inode numbers that should be considered to be invalid (or invalid entries).

For invalid tracking information entries, the resource cache component can process the previously maintained resource in a number of ways. In one embodiment, at block 686, the resource cache component can transmit requests for updated resources. The requests for the updated resources can be transmitted to the origin source from which the previous version of the resource was obtained. Alternatively, the invalid entry notification information, or other information maintained in the inode data structure, can identify one or more different origin sources for the resource to be updated. At block 688, the resource cache component obtains the updated sources from the corresponding origin source. At block 690, the cache management component updates the tracking information. In an illustrative embodiment, the updating of the tracking information can include resetting the expiration criteria, substituting new expiration criteria and the like. Additionally, although blocks 686-690 relate to obtaining updated versions of an invalid resource, in different embodiments, the cache management component or resource cache component can designate the resource as stale, invalid, corrupt, unavailable or include warnings that the information may not be accurate.

At decision block 690, a test is conducted to determine whether cache management component should notify other resource cache components associated with other POPs. In an illustrative embodiment, one or more entries in the inode data structure can include information identifying one or more POPs that are believed to store the corresponding resource. If the inode data structure, or other information, does not identify another cache management component, the routine 680 proceeds to block 696. Alternatively, if the inode data structure includes information identifying one or more cache management components to notify of the invalid entry, at block 694, the cache management component transmits an invalid entry notification to the identified cache management components. As previously described, the identification of the cache management components identified in the inode data structures may be provided by the network storage provider 110 or CDN service provider 106. Additionally, the identification of cache management components can also be facilitated through peer-to-peer distribution models. At block 696, the routine 680 terminates.

Figure 7A:
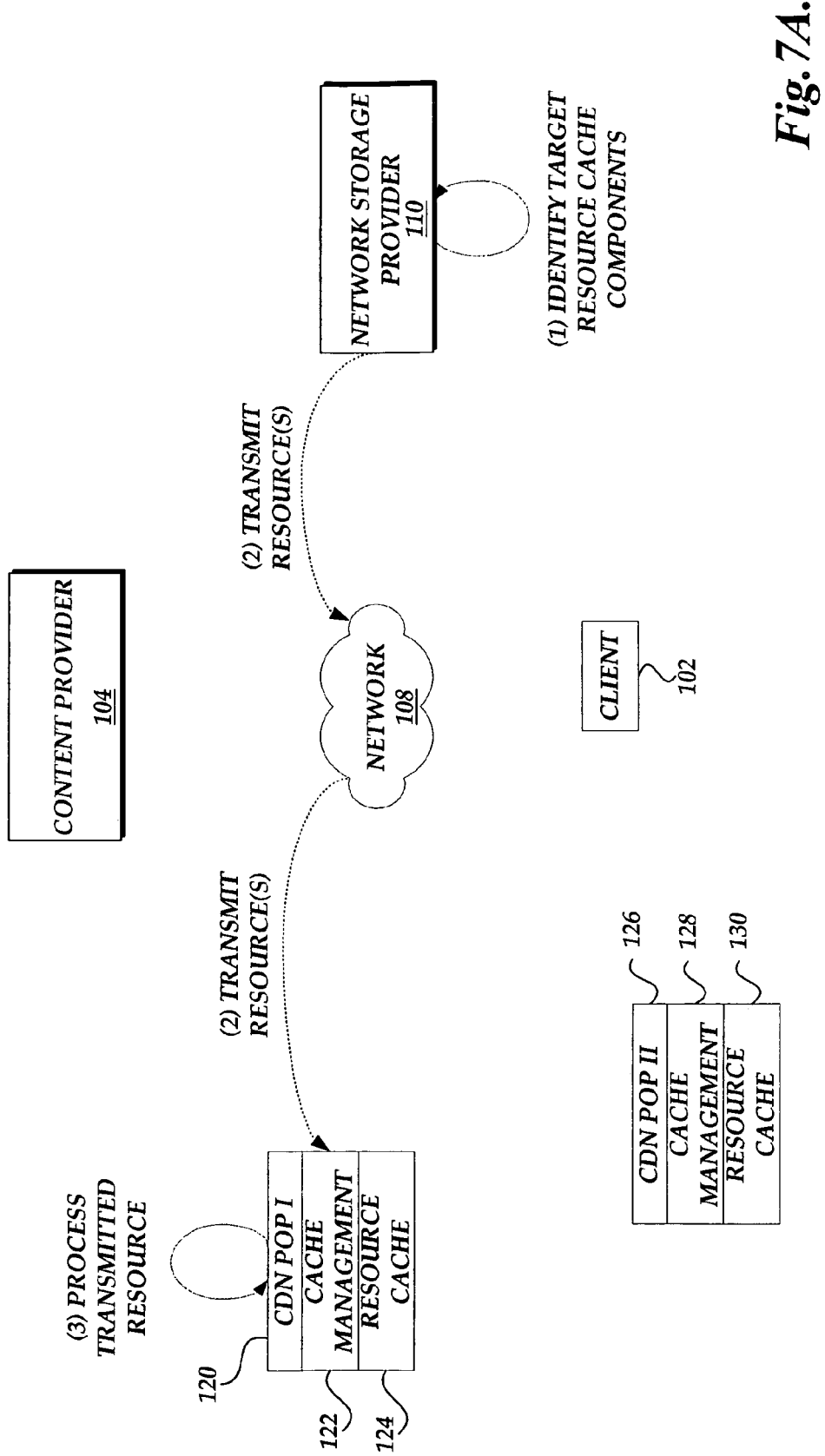

With reference now to FIGS. 7-8, another embodiment illustrating the interaction between various components of the content delivery environment 100 of FIG. 1 will be described. Specifically, FIGS. 7-8 illustrate an embodiment in which a network storage provider distributes resources to selected resource cache components without requiring a previous request. Additionally, the network storage provider 110 can transmit updates to the previously transmitted resources. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure Referring to FIG. 7A, the storage service provider 110, such as via a SM component, obtains a resource such as from a content provider 104. The network storage provider 110 then identifies a target set of resource cache components that may receive the received resource or a set of resources. In an illustrative embodiment, network storage provider 110 may select all of the resource cache components associated with a CDN service provider 106. Alternatively, the network storage provider 110 may select a subset of resource cache components based on various criteria, such as geographic location, time zone, geopolitical criteria, geographic borders, usage criteria, resource utilization (real time or historical), criteria submitted by the resource cache components (including registration information) and the like. The network storage provider 110 then transmits the resource or set of resources to the selected resource cache components. In an illustrative embodiment, the selected resource cache components can process the received resource by either storing at least a subset of the resources in the resource cache component or otherwise rejecting some portion of the resources. For example, the resource cache component may be configured to accept unsolicited resource if processing/capacity resources are below a threshold level.

With reference now to FIG. 7B, after distribution of the resource to the selected set of resource cache components, network storage provider 110 obtains updated resources from the content provider 104 or otherwise determines that the previously distributed resources are invalid. The network storage provider 110 can then transmit the updated resource to one or more resource cache components previously known to have the previous version of the resource. In one embodiment, the network storage provider 110 can transmit the updated resource to the same set of resource cache components. In another embodiment, the network storage provider 110 may select a subset of the resource cache components that previously received the resource. For example, the network storage provider 110 may exclude any resource cache component that did not accept the previous version of the resource.

Turning now to FIG. 8, a routine 800 implemented by a network storage provider, such as via an SM component, will be described. It will be appreciate that any particular functionality associated with one of the components could be implemented by the other component illustrated in the content delivery environment 100, such as component associated with the CDN service provider 106 or components associated with a content provider 104. Additionally, the method may be implemented multiple components associated with the network source provider 108, by another component associated with a NSP POP or any component distributed across a communication network 108. At block 802, the network storage provider 110 obtains one or more resources for storage as an origin source. An illustrative registration of the network storage provider 110 was previously discussed with regard to FIG. 2A. At block 804, the network storage provider 110 identifies a set of resource cache component for distributing resources. In an illustrative embodiment, the set of resource cache components can include one or more resource cache components. Additionally, as previously described, the network storage provider 110 can select the set of resource cache components utilizing various organizational criteria. At block 806, the network storage provider 110 transmits one or more resources to the selected set of resource cache components. The network storage provider 110 can also associate additional sorting criteria in selecting the resources that are transmitted to the set of resource cache components. For example, resources can be selected based on popularity of resource, frequency of selection, estimated costs, service level agreements, and the like.

At block 808, the network storage provider 110 obtains updated resources. For example, the network storage provider 110 may obtain the updated resource from content provider 104. In another example, the network storage provider 110 may process or analyze the resource to determine that the resource is no longer valid or to update one or more parameters/values associated with the resource. At block 810, the network storage provider 110 transmits the updated resource to the set of resource cache components. As previously described, the network storage provider 110 may select only a subset of the set of resource cache components based on additional criteria. At block 812, the routine 800 terminates.

With reference now to FIGS. 9-10, another embodiment illustrating the interaction between various components of the content delivery environment 100 of FIG. 1 will be described. Specifically, FIGS. 9-10 illustrate an embodiment in which the network storage provider 110 provides a notification service in which various resource cache components can register and receive notifications for the request of updated resources from the network storage component 110. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 9A:
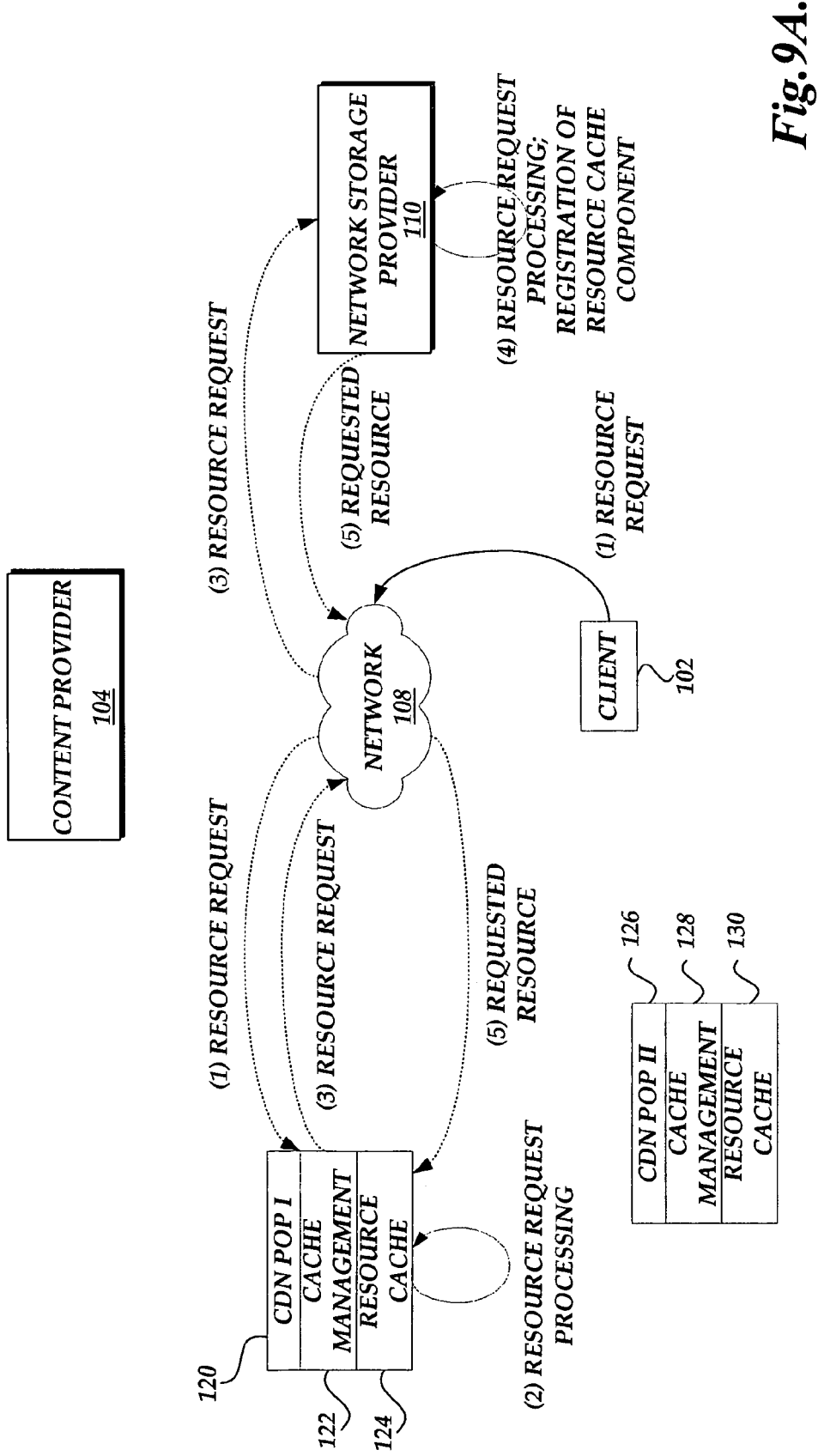

With reference to FIG. 9A, a client computing device 102 subsequently generates a content request that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers will generally in the form of the modified URLs, described above.

Upon receipt of the requested content, the client computing device 102, such as through a browser software application, begins processing any of the markup code included in the content and attempts to acquire the resources identified by the embedded resource identifiers (e.g., the embedded, modified URLs). Although not illustrated in FIG. 9A (or will be described in detail), the acquisition of the identified resources begins with the issuance of DNS queries by the client computing device 102 that are resolved by identifying an IP address corresponding to a CDN service provider POP that will attempt to provide the subsequently requested content. For purposes of illustration in FIG. 9A, it is assumed that the client computing device 102 has been provided the IP address of POP I 120. Accordingly, the client computing device 102 can begin issuing content requests, such as requests corresponding to the hypertext transfer protocol ("HTTP"), to POP I 120, which in turn are processed by resource cache component 124. If a requested resource is maintained by the resource cache component 124, the resource cache component can provide the requested resource to the client computing device 102.

Alternatively, if the resource cache component 124 does not maintain the requested resource, as illustrated in FIG. 9A, the resource cache component transmits a resource request to the origin source identified in the resource request, such as in a URL corresponding to the resource request or via information maintained by the resource cache component. For purposes of illustration, it is assume that storage service provider 110 operates as the origin source, or origin server, for the requested resource on behalf of the content provider 104. The storage service provider 110, or NSP POP, processes the resource request and provides the requesting resource cache component with the requested resource. In this illustrative embodiment, the cache management component 122 or resource cache component 124 can include a registration request to the network storage provider 110. The registration request corresponds to a request to receive notification if the requested resource is updated. In one embodiment, the registration request can be included as part of the resource request or be automatically interpreted with receipt of a resource request. Alternatively, the registration request may be implemented as a separate transaction. The resource cache component 124 can then provide the client computing device 102 with the requested resource.

Figure 9B:
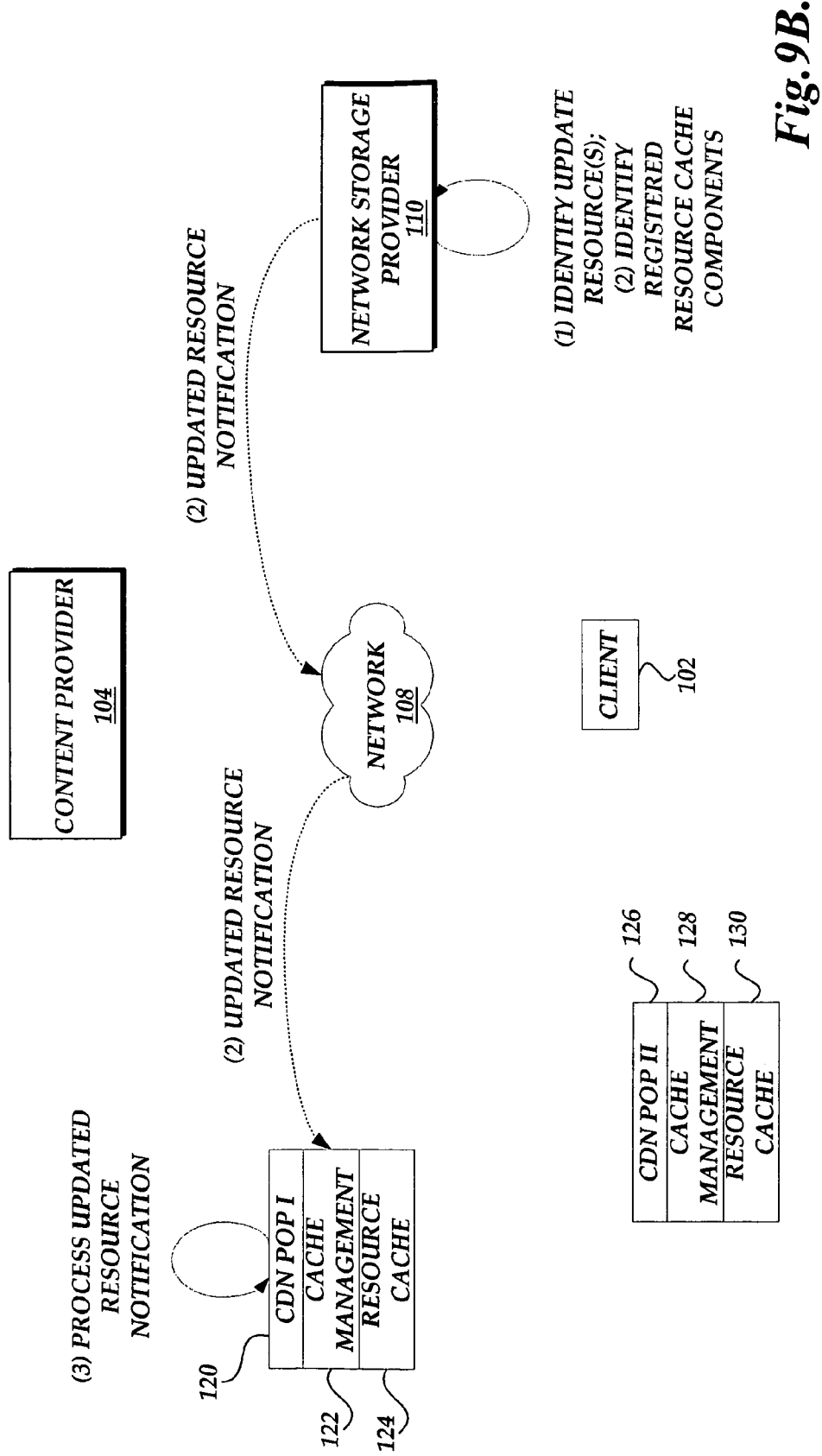
Figure 9C:
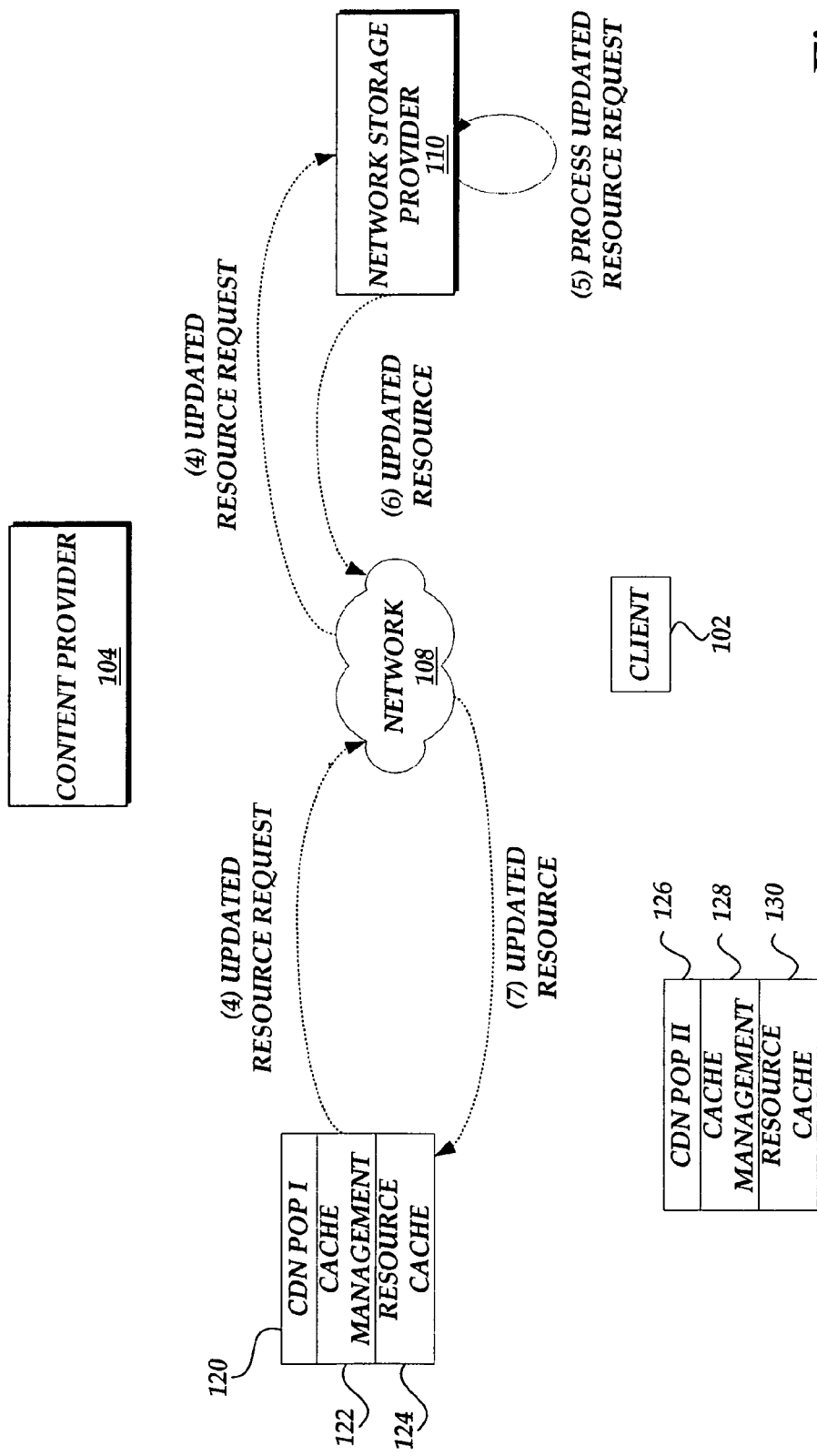

With reference now to FIGS. 9B and 9C, after the distribution of the resource to the resource cache component 122, the network storage provider 110, such as via an SM component, identifies one or more resources to be updated. For example, the network storage provider 110 may obtain updated resources from the content provider 104 or otherwise determine that the previously distributed resources are invalid. As illustrated in FIG. 9 Based on the determination of an updated resource, the network storage provider 110 identifies the resource cache components (or cache management components) that have previously registered to receive notifications. The network storage provider then transmits the notifications to the registered resource cache components. With reference to FIG. 9C, based on the processing of the notification, the resource cache component then transmits an updated resource request to the network storage provider 110. The network storage provider 110 can then transmit the updated resource to the resource cache component responsive to the updated resource request.

Figure 9E:
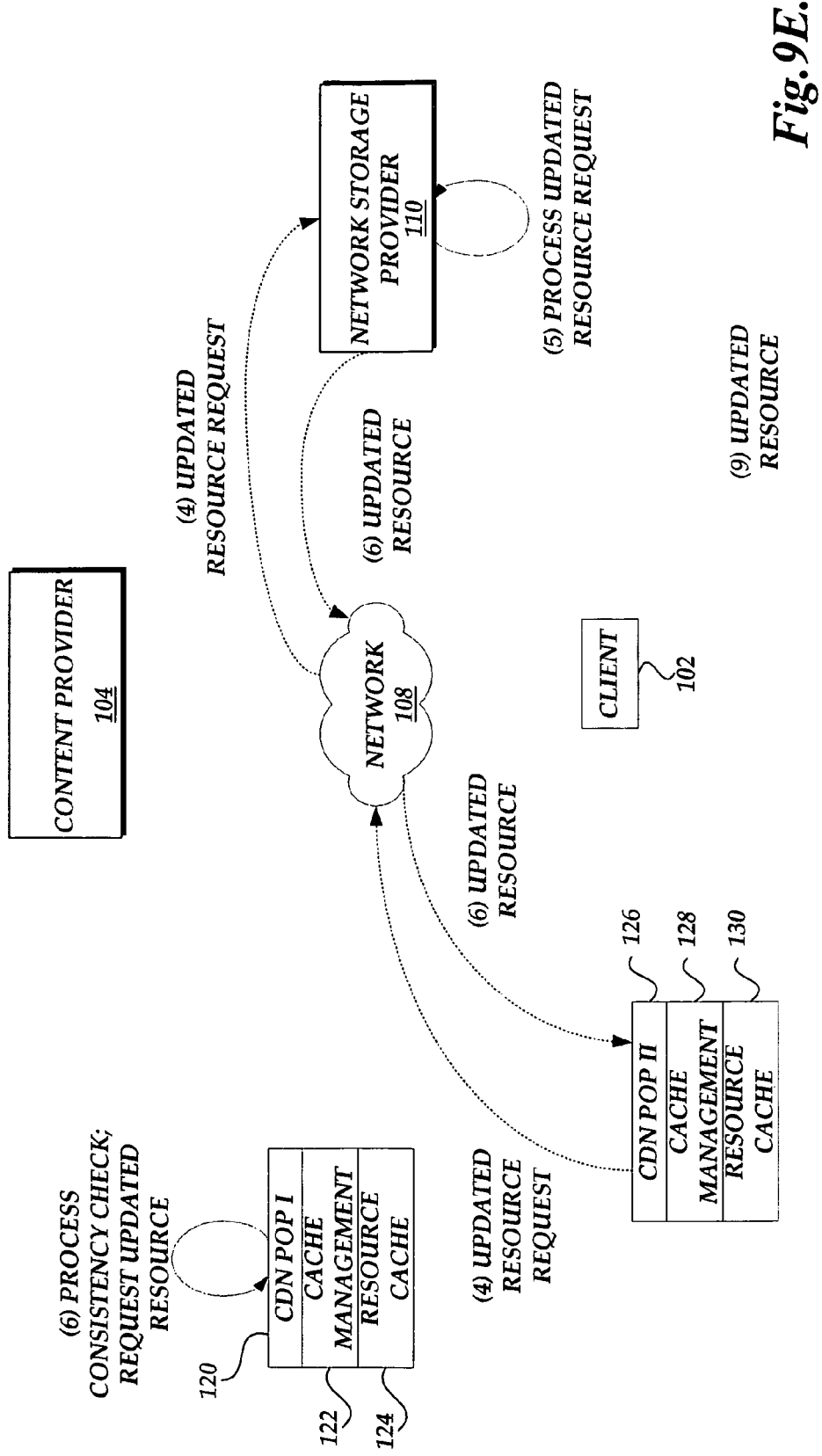

In one embodiment, upon receipt and processing of the notification from the network storage provider, the resource cache component (or cache management component) can also distribute additional notifications to peer resource cache components. With reference to FIGS. 9D and 9E, in an illustrative embodiment, the resource cache component can maintain tracking, such as the inode data structure previously described, to identify other resource cache components that may also be maintained the previous version of the resource that has been identified as invalid. Accordingly, the cache management component 122 utilizes the information to identify one or more resource cache components that have the resource.

With reference now to FIG. 9B, the receiving cache management component 128 can then component transmits a request for an updated resource. The request can then be processed by the network storage component, which provides the updated resource, or set of resources. The resource management component 128 can then process the incoming updated resources in a manner as described with regard to FIG. 9a. Alternatively, the cache management component 128 may be configured in a manner such that updates are received from the network storage provider 110 only by a designated resource cache component 122. In this embodiment, the cache management component 128 would not need to update any additional tracking information.

Referring now to FIG. 10, a routine 1000 implemented by a network storage provider, such as via an SM component, will be described. It will be appreciate that any particular functionality associated with one of the components could be implemented by the other component, by multiple components or by another component associated with a NSP POP or any component distributed across a communication network 108. At block 1002, the network storage provider 110 obtains one or more resource requests from resource cache components. Based on the resource requests (or based on a separate request), at block 1004, the network storage provider registers resource cache components to receive notifications regarding the invalidity of the requested resources.

At block 1006, the network storage provider 110 transmits the requested resource to the identified set of resource cache components response to the resource requests. At block 1008, the network storage provider 110 obtains updated resources. For example, the network storage provider 110 may obtain the updated resource from content provider 104. In another example, the network storage provider 110 may process or analyze the resource to determine that the resource is no longer valid or to update one or more parameters/values associated with the resource. At block 1010, the network storage provider 110 transmits the updated resource notification to the set of resource cache components that previously registered with the network service provider 110. The receiving resource cache components can then request the updated resource from the network storage provider. At block 1012, the routine 1010 terminates.

One skilled in the relevant art will appreciate that the various embodiments described with regard to FIGS. 2-6, 7-8, and 9-10 may be practiced independently by the network storage provider 100 and CDN service provider 106. Additionally, a network storage provider 110 or CDN service provider 106 may combine one or more of the embodiments based on particular financial costs, the number of NSP POPs or CDN POPs, financial criteria, service level criteria and the like.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing resources comprising:
    obtaining a request for a resource from a requesting computing device;
    determining the requested resource is not available;
    transmitting a request for the resource to an identified source;
    obtaining the requested resource from the identified source;
    causing the storage of the requested resource;
    associating the requested resource with an entry in tracking information, the entry identifying the requested resource;
    prior to termination of an expiration criteria associated with the requested resource, determining the entry in the tracking information associated with the requested resource is invalid based on at least one of processing consistency check information received from an origin source responsive to a request thereto or processing tracking information entry invalidity information from the origin source responsive to a request thereto;
    determining a stored resource is not valid based on the invalid entry in the tracking information; and
    processing the determined not valid resource;
    wherein the method is implemented on one or more computing devices of a content delivery service provider that at least one of hosts or processes content on behalf of the origin source.

2. The method as recited in claim 1, wherein the tracking information corresponds to an inode data structure.

3. The method as recited in claim 2, wherein the entries in the inode data structure are arranged in a tree structure.

4. The method as recited in claim 3, wherein the tracking information entry invalidity information corresponds to update information.

5. The method as recited in claim 4, wherein processing the tracking information invalidation information includes:
    obtaining the update information from the origin source; and
    identifying invalid entries in the tracking information based on the update information.

6. The method as recited in claim 1 further comprising:
    associating expiration criteria with the entry in the tracking information corresponding to the resource; and
    determining satisfaction of the expiration criteria.

7. The method as recited in claim 6 further comprising transmitting a consistency check request to the origin source associated with the resource based on the determined satisfaction of the expiration criteria.

8. The method as recited in claim 1 further comprising transmitting invalid entry notification to at least one additional cache server component of the content delivery service provider, the at least one cache server component identified in the tracking information.

9. The method as recited in claim 1, wherein processing the determined not valid resource includes identifying the resource as unavailable for distribution.

10. The method as recited in claim 1, wherein processing the determined not valid resource includes transmitting a request to the origin source for an updated resource.

11. A computer-implemented method for managing resources comprising:
    associating requested resources with entries in tracking information, the entries identifying the requested resources;
    determining one or more entries in the tracking information is invalid prior to termination of expiration criteria associated with the one or more resources corresponding to the one or more entries, wherein the determination is based on processing information identifying invalid tracking information entries received from at least one of an origin source or a third party source;
    determining at least one stored resource is not valid based on the one or more invalid entries in the tracking information;
    processing the determined not valid resource; and
    transmitting a notification to one or more resource cache components, the notification identifying at least one of an invalid tracking information entry or an invalid resource,
    wherein the method is implemented on one or more computing devices of a content delivery service provider that hosts or processes content on behalf of the origin source.

12. The method as recited in claim 11, wherein the tracking information corresponds to an inode data structure.

13. The method as recited in claim 12, wherein the entries in the inode data structure are arranged in a tree structure.

14. The method as recited in claim 13, wherein the tracking information entry invalidity information corresponds to update information.

15. The method as recited in claim 14, wherein processing the tracking information invalidation information includes:
   obtaining the update information from the origin source; and
   identifying invalid entries in the tracking information based on the update information.

16. The method as recited in claim 11 further comprising obtaining the processing information identifying invalid tracking information from the origin source.

17. The method as recited in claim 11 further comprising obtaining the processing information identifying invalid tracking information from the third party source.

18. A computer-implemented method for managing resources comprising:
   associating requested resources with entries in tracking information, the entries identifying the requested resources;
   determining one or more entries in the tracking information are invalid prior to termination of expiration criteria associated with the one or more resources corresponding to the one or more entries, wherein the determination is based on processing consistency check information received from an origin source;
   determining at least one stored resource is not valid based on the one or more invalid entries in the tracking information; and
   processing the determined not valid resource; and
   transmitting a notification to one or more resource cache components, the notification identifying at least one of an invalid tracking information entry or an invalid resource,
   wherein the method is implemented on one or more computing devices of a content delivery service provider that hosts or processes content on behalf of the origin source.

19. The method as recited in claim 18, wherein the tracking information corresponds to an inode data structure.

20. The method as recited in claim 19 further comprising:
   associating the expiration criteria with entries in the tracking information; and
   determining satisfaction of the expiration criteria.

21. The method as recited in claim 20 further comprising:
   transmitting a consistency check request to the origin source associated with the resource.

22. The method as recited in claim 19, wherein the entries in the Mode data structure are arranged in a tree structure.

23. A system for managing content requests comprising:
   a storage service including one or more storage service providers for maintaining resources via a communication network;
   a content delivery service provider having one or more points of presence on the communication network, wherein the content delivery service provider is different from the one or more storage service providers, each of the points of presence of the content delivery service provider including:
      one or more data stores for maintaining resources obtained from the storage service;
      tracking information including entries corresponding to resources maintained in the one or more data stores of the point of presence of the content delivery service provider; and
      a resource management component operative to:
         associate resources obtained from the storage service with an entry in the tracking information;
         determine an entry in the tracking information is invalid prior to termination of an expiration criteria associated with the resource corresponding to the entry, wherein the determination is based on at least one of processing consistency check information provided by one of the one or more storage service providers and receipt of information from one of the one or more storage service providers identifying invalid tracking information entries;
         process the resource corresponding to the entry in the tracking information; and
         transmit notification regarding the invalid entry to at least one additional point of presence of the content delivery service provider.

24. The system as recited in claim 23, wherein the tracking information corresponds to an inode data structure.

25. The system as recited in claim 24, wherein the entries in the inode data structure are arranged in a tree structure.

26. The system as recited in claim 25, wherein the resource management component determines an invalid entry by receipt of update information corresponding to the tree structure.

27. The system as recited in claim 23, wherein the resource management component is further operative to:
   associate expiration criteria associated with each resource obtained from the storage service with each corresponding entry in the tracking information; and
   determine satisfaction of the expiration criteria associated with at least one entry in the tracking information.

28. The system as recited in claim 27, wherein, responsive to a determination that the expiration criteria has not been met, the resource management component is further operative to:
   transmit a consistency check request to one of the one or more storage service providers of the storage service; and
   process responsive consistency check information to determine whether entries in the tracking information are invalid.

29. The system as recited in claim 23, wherein the resource management component is further operative to request an updated resource from the one or more storage service providers based on the determination of invalid tracking information entries.

30. A system for managing content requests comprising:
   one or more data stores for maintaining resources obtained from an origin source;
   tracking information including entries corresponding to resources maintained in the one or more data stores; and
   at least one processor executing instructions corresponding to a resource management component, wherein the at least one processor corresponds to a content delivery service provider operable to at least one of host or process content on behalf of the origin source, the resource management component operative to:
      associate resources obtained from the origin source with entries in the tracking information;
      determine whether entries in the tracking information are invalid prior to termination of expiration criteria associated with the resources corresponding to the entries, wherein the determination is based on at least one of processing of consistency check information received from the origin source or a third party component responsive to a request thereto and receipt of information from the origin source identifying invalid tracking information entries; and process the resource corresponding to the entry in the tracking information.

31. The system as recited in claim 30, wherein the tracking information corresponds to an inode data structure.

32. The system as recited in claim 31, wherein the entries in the inode data structure are arranged in a tree structure.

33. The system as recited in claim 30, wherein the resource management component is further operative to:
   transmit a consistency check request to the origin source based on satisfaction of expiration criteria; and
   process responsive consistency check information to determine whether entries in the tracking information are invalid.

34. The system as recited in claim 30, wherein the resource management component is further operative to request an updated resource based on the determination of invalid tracking information entries.

* * * * *